United States Patent [19]
Kondoh et al.

[11] Patent Number: 5,649,119
[45] Date of Patent: Jul. 15, 1997

[54] DATA QUEUING APPARATUS

[75] Inventors: Harufusa Kondoh, Hyogo; Hideaki Yamanaka, Kanagawa; Masahiko Ishiwaki; Hiromi Notani, both of Hyogo, all of Japan

[73] Assignee: Mitsubishi Denki Kabushiki Kaisha, Tokyo, Japan

[21] Appl. No.: 365,637

[22] Filed: Dec. 28, 1994

[30] Foreign Application Priority Data

Dec. 28, 1993 [JP] Japan .................................. 5-337107
Sep. 6, 1994 [JP] Japan .................................. 6-212950

[51] Int. Cl.$^6$ .............................. G06F 5/01; G06F 13/00
[52] U.S. Cl. .................................................... 395/250
[58] Field of Search ..................... 364/DIG. 1 MS File, 364/DIG. 2 MS File; 370/41, 43, 58.1, 58.2, 60, 61; 395/200.01, 200.17, 250, 849, 850

[56] References Cited

U.S. PATENT DOCUMENTS 4,603,416 7/1986 Servel et al. .................... 370/60
5,504,741 4/1996 Yamanaka et al. ............. 370/58.2

OTHER PUBLICATIONS

"An Asynchronous Time–Division Switched Network", by J. P. Coudreuse et al., International Conference on Communication, 1987, Session 22.

"New Address–Queueing Architecture for a Shared–Buffering Type ATM Switch", H. Yamanaka et al., proceedings of the 1993 IEICE Fall Conference.

"An Elastic Pipeline Mechanism by Self–Timed Circuits", IEEE Journal of Solid–State Circuits, vol. 23, No. 1.

*Primary Examiner*—Robert B. Harrell
*Attorney, Agent, or Firm*—Lowe, Price, LeBlanc & Becker

[57] ABSTRACT

A plurality of shift memories shifting data are connected in series, destination indicating bits indicative of data destination are stored in destination indicating bit memories corresponding to the shift memories respectively, and a searching circuit is provided adjacent to each of the destination indicating bit memories, which searching circuit searches data by searching the destination indicating bits.

25 Claims, 30 Drawing Sheets

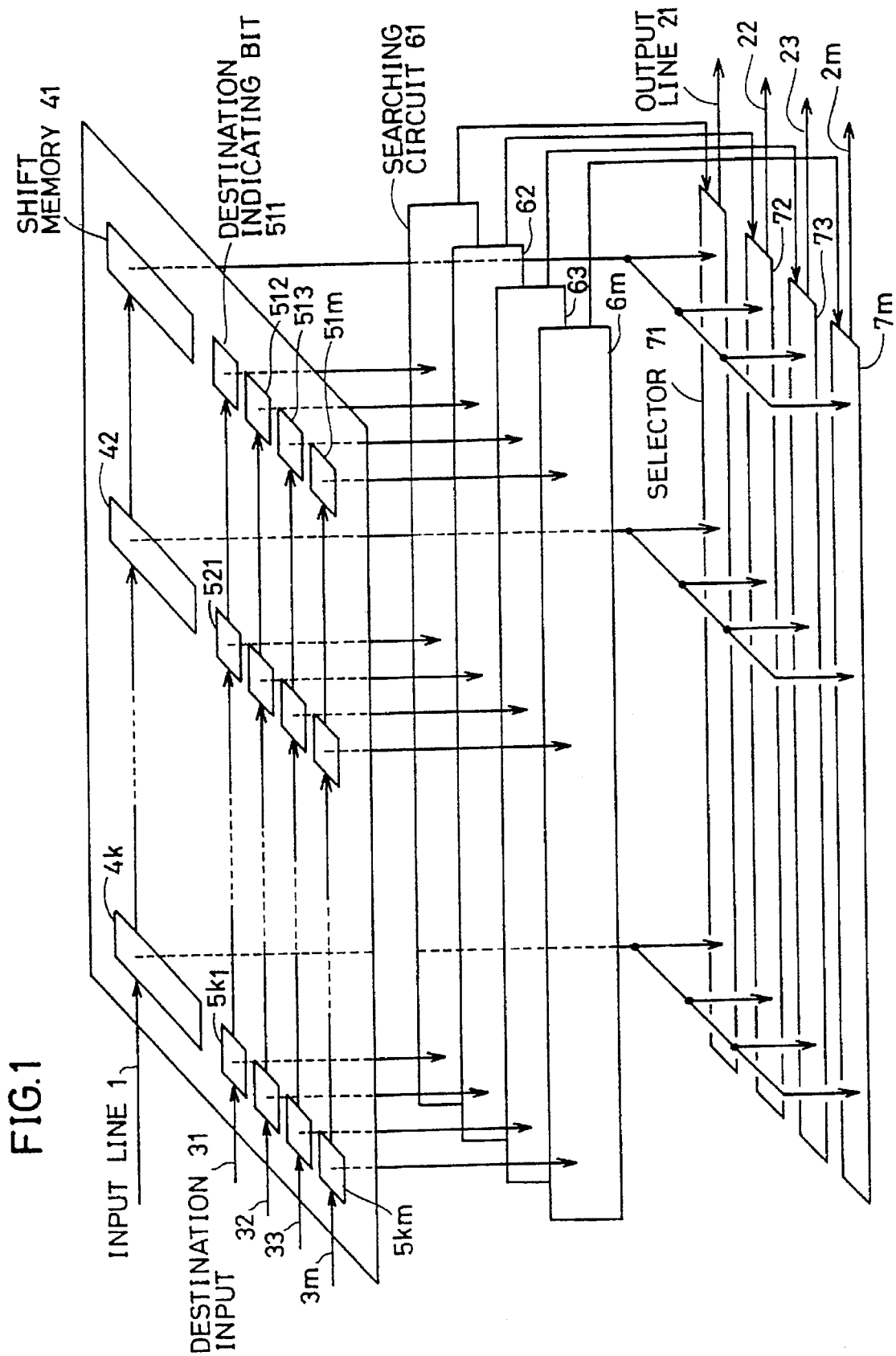

FIG. 2

| | TIME SLOT 1 | TIME SLOT 2 | TIME SLOT 3 | TIME SLOT 4 |
|---|---|---|---|---|
| (a) TIME SLOT VALUE | 1 | 2 | 3 | 4 |
| (b) INPUT LINE 1 | DATA a (TO OUTPUT LINE 24) | DATA b (TO OUTPUT LINE 21) | DATA c (TO OUTPUT LINE 21) | DATA d (TO OUTPUT LINE 21) |
| (c) DESTINATION INPUT 34,33,32,31 | {1,0,0,0} | {0,0,0,1} | {0,0,0,1} | {0,0,0,1} |
| (d) SHIFT MEMORY 46 | EMPTY | DATA a | DATA b | DATA c |
| (e) DESTINATION INDICATING BIT 564,563,562,561 | {0,0,0,0} | {1,0,0,0} | {0,0,0,1} | {0,0,0,1} |
| (f) SHIFT MEMORY 45 | EMPTY | EMPTY | DATA a | DATA b |
| (g) DESTINATION INDICATING BIT 554,553,552,551 | {0,0,0,0} | {0,0,0,0} | {1,0,0,0} | {0,0,0,1}→{0,0,0,0} |
| (h) SHIFT MEMORY 44 | EMPTY | EMPTY | EMPTY | DATA a |
| (i) DESTINATION INDICATING BIT 544,543,542,541 | {0,0,0,0} | {0,0,0,0} | {0,0,0,0} | {1,0,0,0}→{0,0,0,0} |
| (j) SHIFT MEMORY 43 | EMPTY | EMPTY | EMPTY | EMPTY |
| (k) DESTINATION INDICATING BIT 534,533,532,531 | {0,0,0,0} | {0,0,0,0} | {0,0,0,0} | {0,0,0,0} |
| (l) SHIFT MEMORY 42 | EMPTY | EMPTY | EMPTY | EMPTY |
| (m) DESTINATION INDICATING BIT 524,523,522,521 | {0,0,0,0} | {0,0,0,0} | {0,0,0,0} | {0,0,0,0} |
| (n) SHIFT MEMORY 41 | EMPTY | EMPTY | EMPTY | EMPTY |
| (o) DESTINATION INDICATING BIT 514,513,512,511 | {0,0,0,0} | {0,0,0,0} | {0,0,0,0} | {0,0,0,0} |
| (p) OUTPUT LINE 21 | | | | ↑SEARCH DATA d |
| (q) OUTPUT LINE 22 | | | | |
| (r) OUTPUT LINE 23 | | | | |
| (s) OUTPUT LINE 24 | | | | DATA a |

FIG.3

| | TIME SLOT 5 | TIME SLOT 6 | TIME SLOT 7 | TIME SLOT 8 |
|---|---|---|---|---|
| (a) TIME SLOT VALUE | 5 | 6 | 7 | 8 |
| (b) INPUT LINE 1 | | DATA e (TO OUTPUT LINE 22) | DATA f (TO OUTPUT LINE 21) | DATA g (TO OUTPUT LINE 23) |
| (c) DESTINATION INPUT 34,33,32,31 | {0,0,0,0} | {0,0,1,0} | {0,0,0,1} | {0,1,0,0} |
| (d) SHIFT MEMORY 46 | DATA d | EMPTY | DATA e | DATA f |
| (e) DESTINATION INDICATING BIT 564,563,562,561 | {0,0,0,1} | {0,0,0,0} | {0,0,1,0} | {0,0,0,1} |
| (f) SHIFT MEMORY 45 | DATA c | DATA d | EMPTY | DATA e |
| (g) DESTINATION INDICATING BIT 554,553,552,551 | {0,0,0,1} | {0,0,0,1} | {0,0,0,0} | {0,0,1,0}→{0,0,0,0} |
| (h) SHIFT MEMORY 44 | EMPTY | DATA c | DATA d | EMPTY |
| (i) DESTINATION INDICATING BIT 544,543,542,541 | {0,0,0,0} | {0,0,0,1} | {0,0,0,1} | {0,0,0,0} |
| (j) SHIFT MEMORY 43 | EMPTY | EMPTY | DATA c | DATA d |
| (k) DESTINATION INDICATING BIT 534,533,532,531 | {0,0,0,0} | {0,0,0,0} | {0,0,0,1} | {0,0,0,1} |
| (l) SHIFT MEMORY 42 | EMPTY | EMPTY | EMPTY | DATA c |
| (m) DESTINATION INDICATING BIT 524,523,522,521 | {0,0,0,0} | {0,0,0,0} | {0,0,0,0} | {0,0,0,1}→{0,0,0,0} |
| (n) SHIFT MEMORY 41 | EMPTY | EMPTY | EMPTY | EMPTY |
| (o) DESTINATION INDICATING BIT 514,513,512,511 | {0,0,0,0} | {0,0,0,0} | {0,0,0,0} | {0,0,0,0} |
| (p) OUTPUT LINE 21 | | | | ↑SEARCH DATA c |
| (q) OUTPUT LINE 22 | | | | DATA e |
| (r) OUTPUT LINE 23 | | | | |
| (s) OUTPUT LINE 24 | | | | |

FIG.4

| | | TIME SLOT 9 | TIME SLOT 10 | TIME SLOT 11 | TIME SLOT 12 |
|---|---|---|---|---|---|
| (a) | TIME SLOT VALUE | 9 | 10 | 11 | 12 |
| (b) | INPUT LINE 1 | | | | |
| (c) | DESTINATION INPUT 34,33,32,31 | {0,0,0,0} | {0,0,0,0} | {0,0,0,0} | {0,0,0,0} |
| (d) | SHIFT MEMORY 46 | DATA g | EMPTY | EMPTY | EMPTY |
| (e) | DESTINATION INDICATING BIT 564,563,562,561 | {0,1,0,0} | {0,0,0,0} | {0,0,0,0} | {0,0,0,0} |
| (f) | SHIFT MEMORY 45 | DATA f | DATA g | EMPTY | EMPTY |
| (g) | DESTINATION INDICATING BIT 554,553,552,551 | {0,0,0,1} | {0,1,0,0} | {0,0,0,0} | {0,0,0,0} |
| (h) | SHIFT MEMORY 44 | EMPTY | DATA f | DATA g | EMPTY |
| (i) | DESTINATION INDICATING BIT 544,543,542,541 | {0,0,0,0} | {0,0,0,1} | {0,1,0,0} | |
| (j) | SHIFT MEMORY 43 | EMPTY | EMPTY | DATA f | DATA g |
| (k) | DESTINATION INDICATING BIT 534,533,532,531 | {0,0,0,0} | {0,0,0,0} | {0,0,0,1} | {0,1,0,0}→{0,0,0,0} |
| (l) | SHIFT MEMORY 42 | DATA d | EMPTY | EMPTY | DATA f |
| (m) | DESTINATION INDICATING BIT 524,523,522,521 | {0,0,0,1} | {0,0,0,0} | {0,0,0,0} | {0,0,0,0} |
| (n) | SHIFT MEMORY 41 | EMPTY | DATA d | DATA d | DATA d |
| (o) | DESTINATION INDICATING BIT 514,513,512,511 | {0,0,0,0} | {0,0,0,1} | {0,0,0,1} | {0,0,0,1}→{0,0,0,0} |
| (p) | OUTPUT LINE 21 | | | | DATA d |
| (q) | OUTPUT LINE 22 | | | | |
| (r) | OUTPUT LINE 23 | | | | DATA g |
| (s) | OUTPUT LINE 24 | | | | |

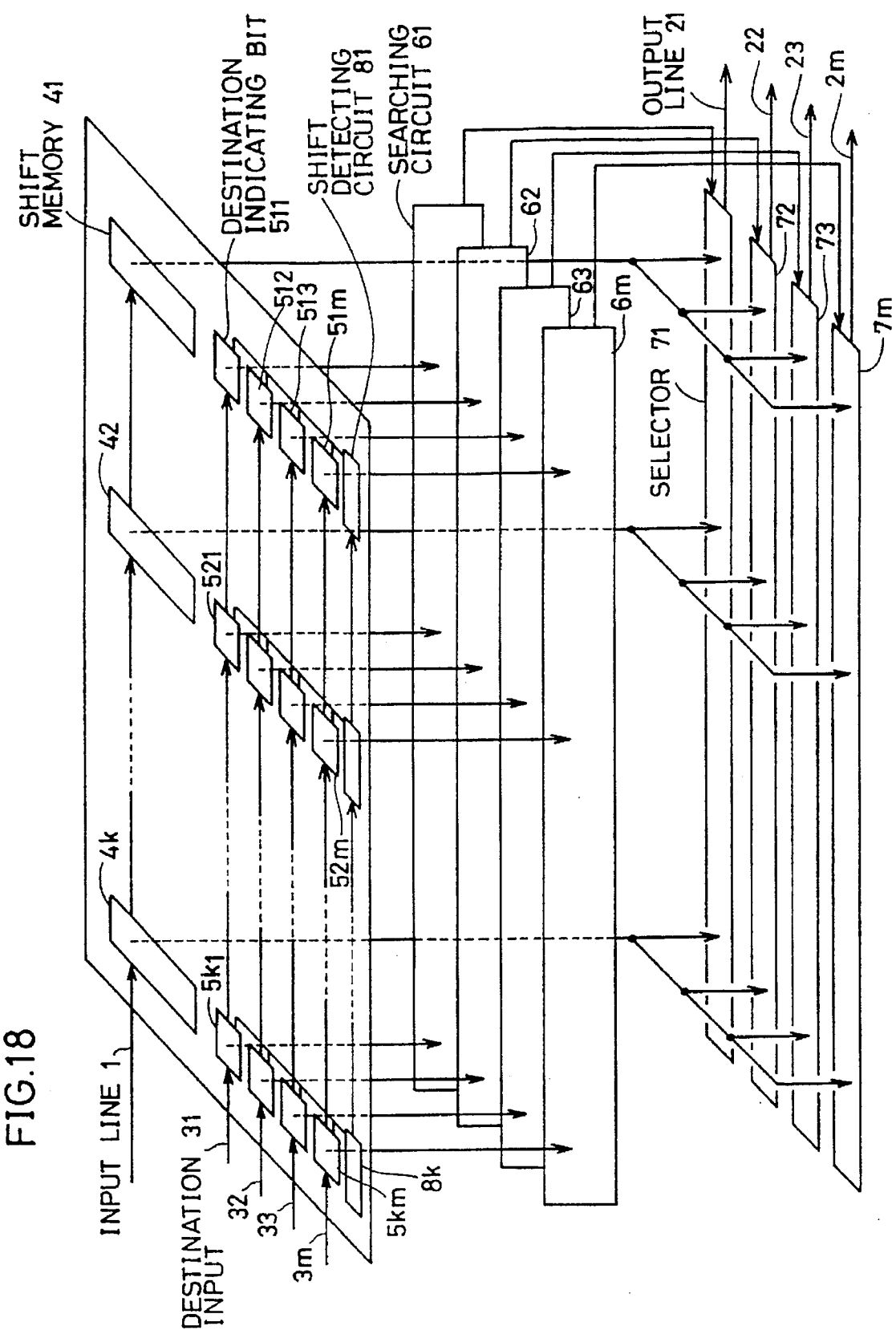

FIG.19

| | TIME SLOT 1 | TIME SLOT 2 | TIME SLOT 3 | TIME SLOT 4 |
|---|---|---|---|---|
| (a) TIME SLOT VALUE | | | | |
| (b) INPUT LINE 1 | DATA a (TO OUTPUT LINES 21,24) | DATA b (TO OUTPUT LINE 22) | DATA c (TO OUTPUT LINE 21) | DATA d (TO OUTPUT LINES 21,22) |
| (c) DESTINATION INPUT {34,33,32,31} | {1,0,0,1} | {0,0,1,0} | {0,0,0,1} | {0,0,1,1} |
| (d) SHIFT MEMORY 46 | EMPTY | DATA a | DATA b | DATA c |
| (e) DESTINATION INDICATING BIT {564,563,562,561} | {0,0,0,0} | {1,0,0,1} | {0,0,1,0} | {0,0,0,1} |
| (f) SHIFT DETECTING CIRCUIT 85 | 0 | 1 | 1 | 1 |
| (g) SHIFT MEMORY 45 | EMPTY | EMPTY | DATA a | DATA b |
| (h) DESTINATION INDICATING BIT {554,553,552,551} | {0,0,0,0} | {0,0,0,0} | {1,0,0,1} | {0,0,1,0}→{0,0,0,0} |
| (i) SHIFT DETECTING CIRCUIT 84 | 0 | 0 | 1 | 1→0 |
| (j) SHIFT MEMORY 44 | EMPTY | EMPTY | EMPTY | DATA a |
| (k) DESTINATION INDICATING BIT {544,543,542,541} | {0,0,0,0} | {0,0,0,0} | {0,0,0,0} | {1,0,0,1}→{0,0,0,0} |
| (l) SHIFT DETECTING CIRCUIT 84 | 0 | 0 | 0 | 1→0 |
| (m) SHIFT MEMORY 43 | EMPTY | EMPTY | EMPTY | EMPTY |
| (n) DESTINATION INDICATING BIT {534,533,532,531} | {0,0,0,0} | {0,0,0,0} | {0,0,0,0} | {0,0,0,0} |
| (o) SHIFT DETECTING CIRCUIT 83 | 0 | 0 | 0 | 0 |
| (p) SHIFT MEMORY 42 | EMPTY | EMPTY | EMPTY | EMPTY |
| (q) DESTINATION INDICATING BIT {524,523,522,521} | {0,0,0,0} | {0,0,0,0} | {0,0,0,0} | {0,0,0,0} |
| (r) SHIFT DETECTING CIRCUIT 82 | 0 | 0 | 0 | 0 |
| (s) SHIFT MEMORY 41 | EMPTY | EMPTY | EMPTY | EMPTY |
| (t) DESTINATION INDICATING BIT {514,513,512,511} | {0,0,0,0} | {0,0,0,0} | {0,0,0,0} | {0,0,0,0} |
| (u) SHIFT DETECTING CIRCUIT 81 | 0 | 0 | 0 | 0 |
| (v) OUTPUT LINE 21 | | | | ↑SEARCH DATA a |
| (w) OUTPUT LINE 22 | | | | DATA b |
| (x) OUTPUT LINE 23 | | | | |
| (y) OUTPUT LINE 24 | | | | DATA a |

FIG. 20

| | TIME SLOT 5 | TIME SLOT 6 | TIME SLOT 7 | TIME SLOT 8 |
|---|---|---|---|---|
| (a) TIME SLOT VALUE | 5 | 6 | 7 | 8 |
| (b) INPUT LINE 1 | | DATA e (TO OUTPUT LINES 21,22,23,24) | DATA f (TO OUTPUT LINE 23) | DATA g (TO OUTPUT LINE 21) |
| (c) DESTINATION INPUT {34,33,32,31} | {0,0,0,0} | {1,1,1,1} | {0,1,0,0} | {0,0,0,1} |
| (d) SHIFT MEMORY 46 | DATA d | EMPTY | DATA e | DATA f |
| (e) DESTINATION INDICATING BIT {564,563,562,561} | {0,0,1,1} | {0,0,0,0} | {1,1,1,1} | {0,1,0,0} |
| (f) SHIFT DETECTING CIRCUIT 85 | 1 | 0 | 1 | 1 |
| (g) SHIFT MEMORY 45 | DATA c | DATA d | EMPTY | DATA e |
| (h) DESTINATION INDICATING BIT {554,553,552,551} | {0,0,0,1} | {0,0,1,1} | {0,0,0,0} | {1,1,1,1} → {0,0,1,1} |
| (i) SHIFT DETECTING CIRCUIT 84 | 1 | 1 | 0 | 1 |
| (j) SHIFT MEMORY 44 | EMPTY | DATA c | DATA d | EMPTY |
| (k) DESTINATION INDICATING BIT {544,543,542,541} | {0,0,0,0} | {0,0,0,1} | {0,0,1,1} | {0,0,0,0} |
| (l) SHIFT DETECTING CIRCUIT 84 | 0 | 1 | 1 | 0 |
| (m) SHIFT MEMORY 43 | EMPTY | EMPTY | DATA c | DATA d |
| (n) DESTINATION INDICATING BIT {534,533,532,531} | {0,0,0,0} | {0,0,0,0} | {0,0,0,1} | {0,0,1,1} → {0,0,0,1} |
| (o) SHIFT DETECTING CIRCUIT 83 | 0 | 0 | 1 | 1→1 |
| (p) SHIFT MEMORY 42 | EMPTY | EMPTY | EMPTY | DATA c |
| (q) DESTINATION INDICATING BIT {524,523,522,521} | {0,0,0,0} | {0,0,0,0} | {0,0,0,0} | {0,0,0,1} → {0,0,0,0} |
| (r) SHIFT DETECTING CIRCUIT 82 | 0 | 0 | 0 | 1→0 |
| (s) SHIFT MEMORY 41 | EMPTY | EMPTY | EMPTY | EMPTY |
| (t) DESTINATION INDICATING BIT {514,513,512,511} | {0,0,0,0} | {0,0,0,0} | {0,0,0,0} | {0,0,0,0} |
| (u) SHIFT DETECTING CIRCUIT 81 | 0 | 0 | 0 | 0 |
| (v) OUTPUT LINE 21 | | | | ↑SEARCH DATA c |
| (w) OUTPUT LINE 22 | | | | DATA d |
| (x) OUTPUT LINE 23 | | | | DATA e |
| (y) OUTPUT LINE 24 | | | | DATA e |

FIG. 21

TIME →

| | TIME SLOT 9 | TIME SLOT 10 | TIME SLOT 11 | TIME SLOT 12 | TIME SLOT 13 |
|---|---|---|---|---|---|
| (a) TIME SLOT VALUE | | | | | |
| (b) INPUT LINE 1 | DATA h (TO OUTPUT LINE 24) | | DATA i (TO OUTPUT LINE 23) | | |
| (c) DESTINATION INPUT {34,33,32,31} | {1,0,0,0} | {0,0,0,0} | {0,1,0,0} | {0,0,0,0} | {0,0,0,0} |
| (d) SHIFT MEMORY 46 | DATA g | DATA h | EMPTY | DATA i | EMPTY |
| (e) DESTINATION INDICATING BIT {564,563,562,561} | {0,0,0,1} | {1,0,0,0} | {0,0,0,0} | {0,1,0,0} | {0,0,0,0} |
| (f) SHIFT DETECTING CIRCUIT 85 | 1 | 1 | 0 | 1 | 0 |
| (g) SHIFT MEMORY 45 | DATA f | DATA g | DATA h | DATA h | DATA i |
| (h) DESTINATION INDICATING BIT {554,553,552,551} | {0,1,0,0} | {0,0,0,1} | {1,0,0,0} | {1,0,0,0}→{0,0,0,0} | {0,1,0,0} |
| (i) SHIFT DETECTING CIRCUIT 84 | 1 | 1 | 1 | 1→0 | 0 |
| (j) SHIFT MEMORY 44 | DATA e | DATA f | DATA g | DATA g | EMPTY |
| (k) DESTINATION INDICATING BIT {544,543,542,541} | {0,0,1,1} | {0,1,0,0} | {0,0,0,1} | {0,0,0,1} | {0,0,0,0} |
| (l) SHIFT DETECTING CIRCUIT 84 | 1 | 1 | 1 | 1 | 0 |
| (m) SHIFT MEMORY 43 | EMPTY | DATA e | DATA f | DATA f | DATA g |
| (n) DESTINATION INDICATING BIT {534,533,532,531} | {0,0,0,0} | {0,0,1,1} | {0,1,0,0} | {0,1,0,0}→{0,0,0,0} | {0,0,0,1} |
| (o) SHIFT DETECTING CIRCUIT 83 | 0 | 1 | 1 | 1→0 | 1 |
| (p) SHIFT MEMORY 42 | DATA d | EMPTY | DATA e | DATA e | EMPTY |
| (q) DESTINATION INDICATING BIT {524,523,522,521} | {0,0,0,1} | {0,0,0,0} | {0,0,1,1} | {0,0,1,1}→{0,0,0,1} | {0,0,0,0} |
| (r) SHIFT DETECTING CIRCUIT 82 | 1 | 0 | 1 | 1→1 | 0 |
| (s) SHIFT MEMORY 41 | EMPTY | DATA d | DATA d | DATA d | DATA e |
| (t) DESTINATION INDICATING BIT {514,513,512,511} | {0,0,0,0} | {0,0,0,1} | {0,0,0,1} | {0,0,0,1}→{0,0,0,0} | {0,0,0,1} |
| (u) SHIFT DETECTING CIRCUIT 81 | 0 | 1 | 1 | 1→0 | 1 |
| | | | | ↑SEARCH | |
| (v) OUTPUT LINE 21 | | | | DATA d | |
| (w) OUTPUT LINE 22 | | | | DATA e | |
| (x) OUTPUT LINE 23 | | | | DATA f | |
| (y) OUTPUT LINE 24 | | | | DATA h | |

DATA QUEUING APPARATUS

BACKGROUND OF THE INVENTION

1. Field of the Invention

The present invention relates to a data queuing apparatus. More specifically, the present invention relates to a data queuing apparatus for controlling addresses of data switching apparatus or a common buffer type data switching apparatus used for temporarily storing, delaying and switching a limited length of data, such as a fixed length packets and block frame information of various kinds of multimedia, for example, voice, data, image and so on.

2. Description of the Background Art

In ATM (Asynchronous Transfer Mode) communication systems, continuous signals such as line signals or voice signals, and bursty signals such as data signal and motion pictures are divided into fixed length of data, appended to a routing header indicative of destination information, for example, and thus a packet is formed. Information is transferred in the same packet form. Synchronization of frame or the like between a terminal and a transmission channel becomes unnecessary, and the operating speed of the terminal equipment and the transmission channel can be set independently. Therefore, the system can be applied to any terminal equipment. However, in a high speed packet switch, packets arrive at random. Therefore, it is possible that a plurality of packets are addressed to one destination at one time, and therefore it becomes necessary for queuing the packets in order to prevent loss of information.

To solve this problem, for example, high speed packet switch is proposed and shown in FIGS. 5 and 6 of International Conference on Communications, 1987, session 22, Document No. 2, Jean-Pierre Coudreuse, Michel Sorvel, "PRELUDE: Asynhcronous Time-Division Switched Network". This document relates to a high speed packet switch of an asynchronous transfer mode (ATM) communication system for efficiently multiplexing and transmitting line switching data or packet switching data. A conventional data queuing apparatus is shown in a control circuit therein.

FIG. 42 is a block diagram showing a conventional high speed packet switch including a data queuing apparatus. Referring to FIG. 42, input lines 111 to 11$m$ are for inputting m (m≧2) data to a packet multiplexing circuit 13. The packet input through input lines 111 to 11$m$ has a fixed length. Packet multiplexing circuit 13 multiplexes the input packets, and it applies arrived routing headers to a control circuit 16 and applies the packets to a memory 14. Data can be written to a designated address of memory 14, and data can be read independent from the order of writing, by designating an address. The data read from memory 14 is applied to a packet demultiplexing circuit 15 in which read packets are demultiplexed and output to output lines 121 to 12$m$. Control circuit 16 controls packet exchange.

FIG. 43 is a block diagram showing details of the control circuit shown in FIG. 42. Control circuit 16 includes data queuing apparatus disclosed in FIG. 10 of the aforementioned article, in schematic representation for simplicity of description. Referring to FIG. 43, control circuit 16 includes a header exchanging circuit 17 and a cyclic selector 20. Header exchanging circuit 17 determines, based on the routing header of the arrived packet, the address of memory 14 to which the packet is written, determines which of the output lines 121 to 12$m$ is the destination of the packet, and exchanges the header with a new routing header. Cyclic selector 20 selects information in order. To data queuing apparatus 18, a write address signal to memory 14 is input through input line 1, and packet destination is input through destination designating input lines 31–3$m$. Packets are output through output lines 21 to 2$m$ after queuing of addresses. Data queuing apparatus 18 includes memories 191 to 19$m$ provided corresponding to output lines 121 to 12$m$, respectively. Data queuing apparatus 18 arranges write address signals of the arrived packets in correspondence to output lines 21 to 2$m$, respectively, thus forming a queue, and output address signals in the order of arrival, from each of the output lines 121 to 12$m$.

The packets which have arrived at the plurality of input lines 111 to 11$m$ of the high speed packet switch shown in FIG. 42 are multiplexed by packet multiplexing circuit 13 and written to memory 14. The routing header including destination information of the arrived packet is applied to control circuit 16, in which header exchanging circuit 17 determines which of destination output lines 121 to 12$m$ is the destination, and the header is exchanged with a new routing header. Addresses written in memory 14 are turned into queues corresponding to respective ones of destination output lines 121 to 12$m$ by data queuing apparatus 18. First In First Out (FIFO) memories 191 to 19$m$ are used in the data queuing apparatus 18.

Meanwhile, in accordance with the addresses read from data queuing apparatus 18, packets are read from memory 14, demultiplexed by packet demultiplexing circuit 15, and the packets are output to prescribed output lines 121 to 12$m$. By the above described operation of the data queuing apparatus 18, packets on the input lines 111 to 11$m$ are provided on the desired output lines 121 to 12$m$, and thus packet exchange is realized.

Since the conventional data queuing apparatus has been structured as described above, when memory 14 has the write capacity of P packets, for example, it is necessary for each of the FIFO memories 191 to 19$m$ to have sufficient capacity for holding P addresses, in order to prevent information loss caused by address overflow. This means that data queuing apparatus 18 as a whole must have the address holding capacity of P×m, which results in large scale apparatus.

Meanwhile, the inventors of the present application have proposed in U.S. patent application Ser. No. 191,335, now U.S. Pat. No. 5,504,741, a data queuing apparatus which is capable of reducing the scale of the apparatus as a whole by making smaller the memory capacity, and which is also capable of reducing ratio of disposal of data caused by memory capacity overflow by sharing a memory holding data queue by all the output lines without the necessity of providing a plurality of memories for holding the data queue.

SUMMARY OF THE INVENTION

Therefore, an object of the present invention is, based on the proposed data queuing apparatus mentioned above, to provide a data queuing apparatus which enables efficient arrangement of various components when a searching circuit is shared by a plurality of output lines.

Another object of the present invention is to provide a data queuing apparatus which can reduce power consumption.

Briefly stated, the data queuing apparatus of the present invention includes destination indicating bit memories storing destination indication bits indicative of the data destination, provided corresponding to a plurality of data shift circuits each shifts while holding data; and searching circuits adjacent to destination indicating bit memories, for searching the destination indicating bit and for providing the search data.

Therefore, according to the present invention, since searching circuits are arranged adjacent to the destination indicating bit memories, the layout efficiency can be improved.

In a more preferred embodiment, the destination indicating bit memory includes a latch for latching a destination indicating bit; and a control circuit for controlling the latch circuit such that when the latch circuit is not holding any destination indicating bit, the latch circuit is made to hold the destination indicating bit of the succeeding stage, and when the latch circuit of the preceding stage is not holding any destination indicating bit, the destination indicating bit of the latch circuit is shifted to said preceding stage.

In a more preferred embodiment, destination indicating bits from a plurality of destination indicating bit memories are subjected to time-division and passed to the searching circuit through a bus.

According to another aspect of the present invention, plural stages of data queuing circuits each including a plurality of data shift circuits shifting while holding data, destination indicating bit memories for storing destination indicating bits indicative of respective data destinations, and searching circuits for searching destination indicating bits and providing the searched data are cascade-connected, wherein each data queuing circuit receives data and a destination indicating bit from a data queuing circuit of the succeeding stage and when a data queuing circuit of the preceding stage is empty, provides the data and the destination indicating bit to the empty circuit of the preceding stage.

Therefore, according to the present invention, since a plurality of data queuing circuits can be cascade-connected, the data queuing apparatus can be expanded easily.

In a more preferred embodiment, kth and subsequent stages of the data queuing circuits may be used as FIFO memories, not performing searching or reading.

In a more preferred embodiment, a priority memory for storing priority is provided, and the searching circuit searches in accordance with an AND output of the destination indicating bit and the priority stored in the priority memory.

Therefore, according to this embodiment, when high priority is allotted to data requiring urgent processing, such as data for telephone communication which must be processed on real time basis, the data with high priority can be provided sooner than any data which has been input earlier in the data queuing apparatus.

In a more preferred embodiment, a counter is provided corresponding to each stage of data queuing circuits, and the count value of the counter is incremented every time a data with priority is input to the corresponding data queuing circuit and decremented every time the data with priority is output. The searching circuit searches in response to the value of the counter reaching a prescribed value.

According to a still further aspect of the present invention, the data queuing apparatus includes a plurality of data shift circuits, each shifting while holding data, destination indicating bit memories provided corresponding to the data shift circuits each storing destination indicating bits indicative of data destination, and a searching circuit for searching the destination indicating bit, in which the destination indicating bits are divided into a plurality of groups each group having a plurality of destination indicating bits as a unit, and in which the data queuing apparatus includes a preceding stage data queuing circuit and a succeeding stage data queuing circuit for each of the plurality of groups.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a data queuing apparatus based on which the present invention was made.

FIGS. 2, 3, and 4 are a time charts showing timings of signals at various portions of the block diagram shown in FIG. 1.

FIG. 18 is a block diagram showing another example of the data queuing apparatus based on which the present invention was made.

FIGS. 19, 20, and 21 are time charts showing timings of signals at various portions of the block diagram of FIG. 18.

DESCRIPTION OF THE PREFERRED EMBODIMENTS

Figure 5:
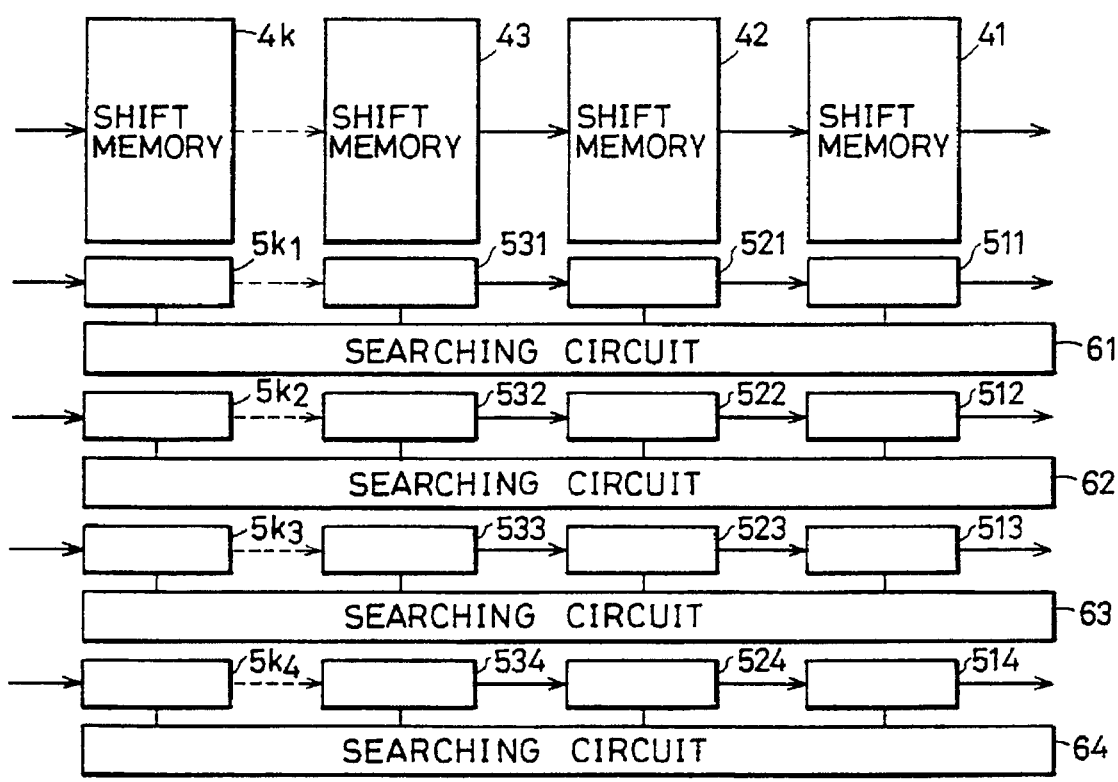
FIG. 5 is a block diagram showing one embodiment of the present invention, showing an example of arrangement of various elements shown in FIG. 1.

FIG. 1 is a block diagram showing the data queuing apparatus disclosed in U.S. patent application Ser. No. 191,335 mentioned above. Referring to FIG. 1, an input line 1 is for receiving data of a limited length, and the input data is applied to a shift memory $4k$. Shift memory $4k$ successively shifts the data applied to input line 1 to a preceding stage. Destination indicating bit memories 511 to $5km$ are provided for shift memories 41, 42, ... $4k$, respectively. For example, destination indicating bit memory 512 indicates, by 1 bit of information, whether the data stored in shift memory 41 has output line 22 as its destination or not. As another example, destination indicating bit memory $5km$ indicates whether or not the data stored in shift memory $4k$ has output line $2m$ as its destination or not. Searching circuits 61, 62, 63 ... $6m$ are provided for output lines 21, 22, 23 ... $2m$, respectively. For example, searching circuit 61 is connected to destination indicating bit memories 511, 521, ... $5k1$. Selectors 71, 72, 73, ... $7m$ are provided for output lines 21, 22, ... $2m$, respectively. For example, selector 71 corresponds to output line 21, and it selects corresponding data in accordance with the searching circuit 61 from shift memories 1 to $4k$, and outputs the selected data to output line 21.

FIGS. 2 to 4 are timing charts showing timings at various portions shown in FIG. 1. The time chart shows changes in state of various portions when the number of input line 1 is 1, the number m of output lines 21 to $2m$ is 4 and the number k of shift memories 41 to $4k$ is 6.

Referring to FIGS. 2 to 4, (a) shows the flow of time on the basis of time slots, in the direction of the abscissa; (b) shows an example of data input to input line 1; and (c) shows destination inputs 34, 33, 32 and 31 indicative of the destination of input data, in this order. Reference characters (d) to (o) show examples of states in respective time slots of the shift memories 41 to 46 and destination indicating bit memories 511 to 564, and (p) to (s) show data output to output lines 21 to 24.

The data input to input line 1 is information of a limited length, which is information in a frame structure sectioned in accordance with a predetermined fixed time period, address information of a fixed length, a packet of a fixed length, and so on. In FIGS. 2 to 4, the time is divided into time periods of fixed length, and the time is specified by the numbers allotted starting from time slot 1, for convenience of description. In FIGS. 2 to 4, it is assumed that one piece of data arrives in each time slot.

In the example shown, before the time slot 1, data has not yet been arrived, or sufficient time period has lapsed from the arrival and output of data, so that there is not any data in any of the internal shift memories 41 to 46. One data arrives in each of the time slots 1, 2, 3, 4, 6, 7 and 8. FIGS. 2 to 4 show an example in which reading from output lines 21 to 24 is performed collectively at every four time slots and data is actually read in time slots 4 and 8.

Simultaneously with the input of data at input line 1, destination information is input through destination input 31 to 34. When the input data has output line 24 as its destination, for example, destination input 34 is asserted. Since asserted bit is represented as "1" in FIGS. 2 to 4, the destination inputs 34, 33, 32 and 31 input at this time correspond to 1, 0, 0, 0. In time slot 1, data a for output line 24 is input, and in time slot 2, data b for output line 21 is input. Now, since shift memory 46 is empty in time slot 1, input data a is shifted immediately. At this time, destination inputs 31 to 34 are fetched in destination indicating bits 564 to 561.

Similarly, in time slot 2, shift memory 45 is empty, and therefore data a is shifted, and to the shift memory 46 which becomes empty, the input data b is shifted. Simultaneously with the shifting of data a from shift memories 46 to 45, the original destination indicating bit memories 564 to 561 are shifted to the destination indicating bit memories 554 to 551 which correspond to the next shift memory 45.

Reading of data to output lines 21 to 24 will be described. FIG. 2 shows an example in which data are collectively output in time slot 4. In order to output data in time slot 4, at the start of time slot 4, searching circuits 61 to 64 search for the data to be output. If there is an asserted bit in the corresponding destination indicating bit memories 511 to 564, it is noticed to the corresponding selectors 71 to 74. Selectors 71 to 74 selects one from the noticed shift memories 41 to 46, and output data to output lines 21 to 24, respectively. For example, searching circuit 61 searches the data to be output to output line 21, and it reads contents of destination indicating bit memories 511, 521, 531, 541, 551 and 561 in this order, and from these contents, asserted bit "1" is searched for. If there is an asserted bit, it is noticed to selector 71. In the example of FIG. 1, selector 71 selects one from six, and in accordance with the instruction from searching circuit 61, selects one from six shift memories 41 to 46, and provides the corresponding data to output line 216.

The operation for providing data to output line 21 described above is independent from other output lines 22 to 24. Therefore, such operation for other output lines can be performed simultaneously and independently. The destination indicating bit memories 511 to 564 are searched by searching circuits 61 to 64, and when any of these is selected as a result of searching, the asserted bit is erased. When a data is read from any of the shift memories 41 to 46, the data is erased. When there is data in the succeeding stage of the shift memories 41 to 46, then the data is shifted therefrom.

The operation will be described in greater detail with reference to FIGS. 2 to 4. In time slots 1 to 4 of FIG. 2, data a, b, c, and d are input respectively, and the input data a, b, c, and d are stored and shifted in shift memories 41 to 4$k$ in the order of arrival. In time slot 4, data is read to output lines 21 to 24, as described above.

Now, in the example of FIG. 2, the data output to output line 21 in time slot 4 will be described. In time slot 4, searching circuit 61 reads contents of destination indicating bit memories 511, 521, 531,541, 551 and 561, in this order. The values of the memories are 0, 0, 0, 0, 1, 1, respectively. When the asserted "1" is searched in this order from these memories, the first corresponding one is the content of the destination indicating bit memory 551, and therefore it is noticed to selector 71. In accordance with the instruction from searching circuit 61, selector 75 selects shift memory 45 out of six shift memories 41 to 46, and provides data b to output line 21. When data b is output to output line 21, shift memory 45 in which data b existed in time slot 4 becomes empty, and therefore data c which was in the succeeding stage in time slot 5 is shifted to shift memory 45. Information of destination indicating bit memories 564, 563, 562 and 561 are also shifted together with data c, to destination indicating bit memories 554, 553, 552 and 551. In the similar manner, data a is output to output line 24.

As for the destination indicating bit memories 512, 522, 532, 542, 552 and 562 corresponding to output line 22, the contents are 0, 0, 0, 0, 0, 0 meaning that there is not an asserted bit. Therefore, searching circuit 62 notices to selector 72 that there is not a data to be output. Consequently, data is not provided from output line 22. In the similar manner, there is not a data output from output line 23.

In time slot 5, data is not input, and therefore respective data are shifted with the data of time slot 5 being empty. In time slots 6 to 8, data e, f and g are input successively. The input data are stored and shifted in shift memories.

In time slot 8, reading of data to output lines is performed as described above. In this case, searching circuit 61 searches data c as the data to be output to output line 21. Searching circuit 62 searches data e as the data to be output to output line 22. The searched data c and e are output to respective output lines. Since there is not an asserted bit in the destination indicating bits for output lines 23 and 24, searching circuits 63 and 64 determine that there is not a data to be output. Therefore, data is not output to output lines 23 and 24. In time slots 9 and 11, data are not provided from the input line. In this case, data which has been already stored in shift memories are shifted successively. Further, in time slot 10 shown in FIG. 4, data d exists in shift memory 41. However, since the shift memory 41 is the last stage, i.e., the shift memory is closest to the output side, data d cannot be further shifted, and it remains in shift memory 41 also in time slot 11.

FIG. 5 is a block diagram showing one embodiment of the present invention. In the example shown in FIG. 1 described above, the circuit is depicted in a three-dimensional manner. However, when the circuit shown in FIG. 1 is to be implemented two-dimensionally on an integrated circuit, the configuration must be modified elaborately. Though technique for three dimensional integrated circuit design has been developed, there is not any implementation of active circuit blocks in a plurality of different layers at a practical cost at present. Therefore, the circuit must be implemented two-dimensionally with high efficiency.

Therefore, in one embodiment of the present invention, searching circuit 61 is provided adjacent to destination indicating bit memories 511 to 5$k$1, searching circuit 62 is provided adjacent to destination indicating bit memories 512 to 5$k$2, searching circuit 63 is provided adjacent to destination indicating bit memories 513 to 5$k$3, and searching circuit 64 is arranged adjacent to destination indicating bit memories 514 to 5$k$4, as shown in FIG. 4. Such arrangement is advantageous in that interconnections between destination indicating bits and the blocks of the searching circuit do not have any influence to other components. Further, what is necessary to implement this circuit configuration is simply to repeat the layout pattern of the combination of the destination indicating bits and the searching circuit for the number of destination indicating bits, and therefore layout efficiency is high.

Figure 6:
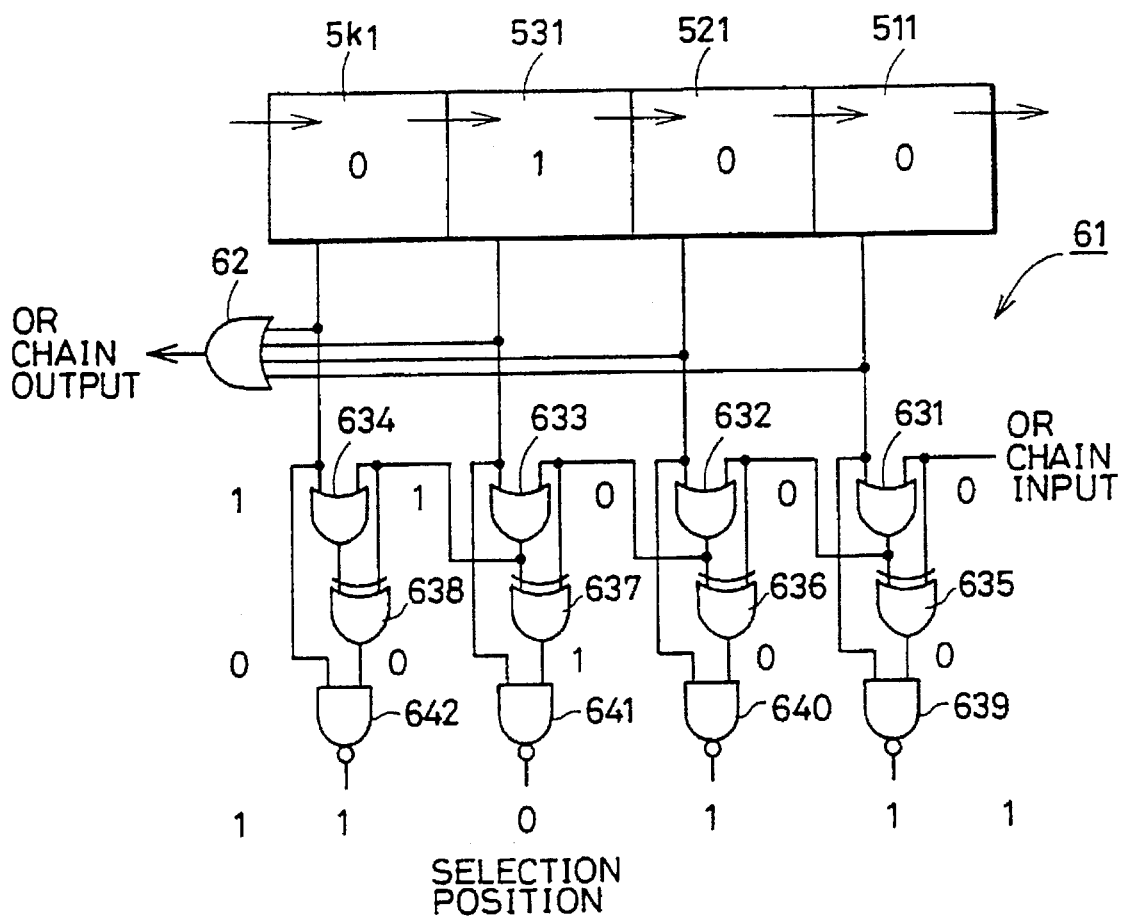
FIG. 6 shows a specific example of the shift memory shown in FIG. 5.

FIG. 6 is a schematic circuit diagram of the searching circuit shown in FIG. 5. To searching circuit 61, destination indicating bits are applied from destination indicating bit memories 511 to 5$k$1. These destination indicating bits are applied to a 4-input OR gate 62 as well as to one input end of each of OR gates 631 to 634 and of AND gates 639 to 642. To the other input end of OR gate 631, an OR chain signal is applied from the preceding stage. To OR gates 632 to 634, output from the OR gates of the preceding stages are applied. Further, outputs from OR gates 631 to 634 are applied to one input end of each of EXOR gates 635 to 638, and output signals of the OR gates of the preceding stage are applied to the other input end. To the other input end of each of NAND gates 639 to 642, output signal from EXOR gates 635 to 638 are applied, respectively.

In the searching circuit 61 shown in FIG. 6, as the destination indicating bits latched in destination indicating bit memories 511 to 5$k$1 are shifted in the right direction of FIG. 6, the outputs of OR gates 631 to 634 change approximately at the same time, and the output from EXOR gates 635 to 638 and from NAND gates 639 to 642 also change accordingly. After shifting operation, approximately at the same time as the completion of shifting, the position of "1" which is positioned at the foremost portion among the destination indicating bits is obtained as the selected position, in negative logic. In other words, in the searching circuit shown in FIG. 6, the time for searching is almost 0. Furthermore, when the destination indicating bit of the selected stage is cleared as the reading operation takes place, there is generated a carry propagation such as shown in the following.

| (Before Reading) | | | |
|---|---|---|---|
| destination indicating bit | | 1 0 0 1 0 0 0 1 0 0 0 0 0 0 0 0 | |
| OR chain output | succeeding stage | 1 1 1 1 1 1 1 1 0 0 0 0 0 0 0 0 | preceding stage |
| selected output | | 1 1 1 1 1 1 1 0 1 1 1 1 1 1 1 1 | |

| (After Reading) | | | |
|---|---|---|---|
| destination indicating bit | | 1 0 0 1 0 0 0 0 0 0 0 0 0 0 0 0 | |
| OR chain output | succeeding stage | 1 1 1 1 0 0 0 0 0 0 0 0 0 0 0 0 | preceding stage |
| Selected output | | 1 1 1 0 1 1 1 1 1 1 1 1 1 1 1 1 | |

Of the destination indicating bits, OR chain outputs and the selected outputs, those underlined are the changed bits.

The AND gate 639 to 642 shown in FIG. 6 utilizes an AND of the outputs from EXOR gates 635 to 638 and the destination indicating bit for selection, in order to prevent erroneous selection of a portion which is in transition, when reading operation is performed without sufficient time lapse after clearing. In this manner, since searching circuit is provided for every destination indicating bit, a circuit directly connected to the destination indicating bit memories 511 to 5k1 is used instead of a clock synchronized searching circuits, and therefore the time for searching can be seemingly eliminated.

Figure 7:
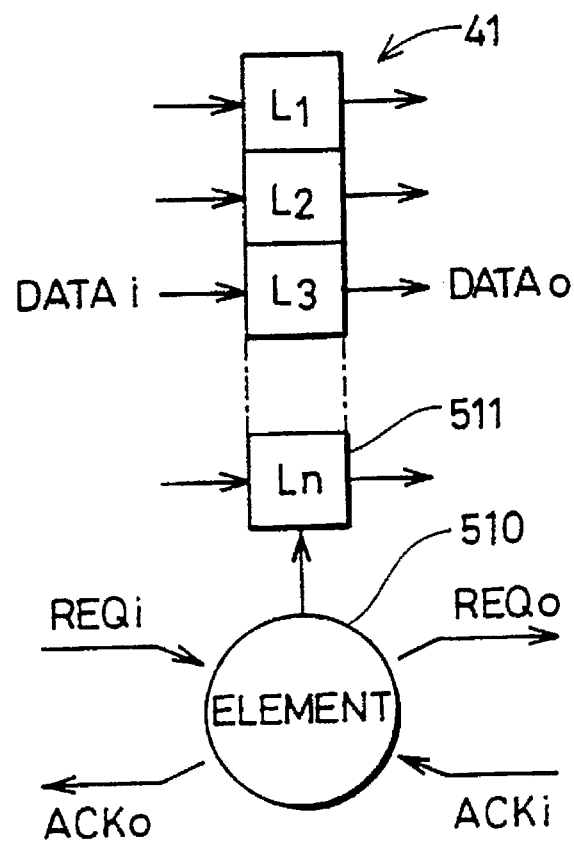
FIG. 7 is a block diagram showing an example of a C element for shifting of the shift memory shown in FIG. 6.
Figure 8:
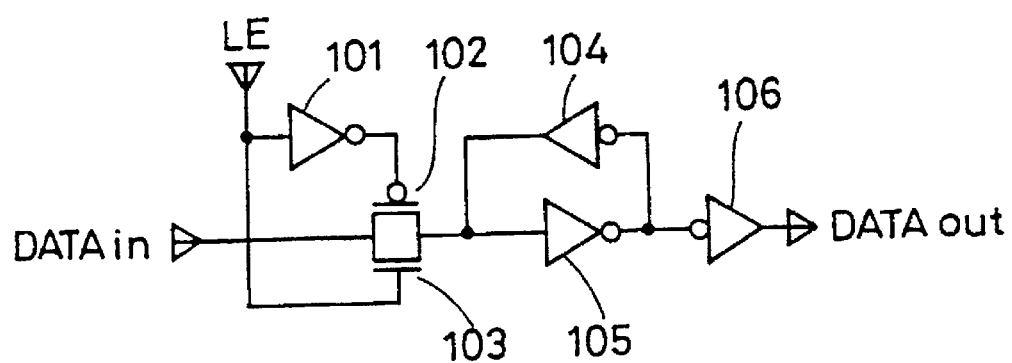
FIG. 8 is a specific circuit diagram of the latch shown in FIG. 7.
Figure 9:
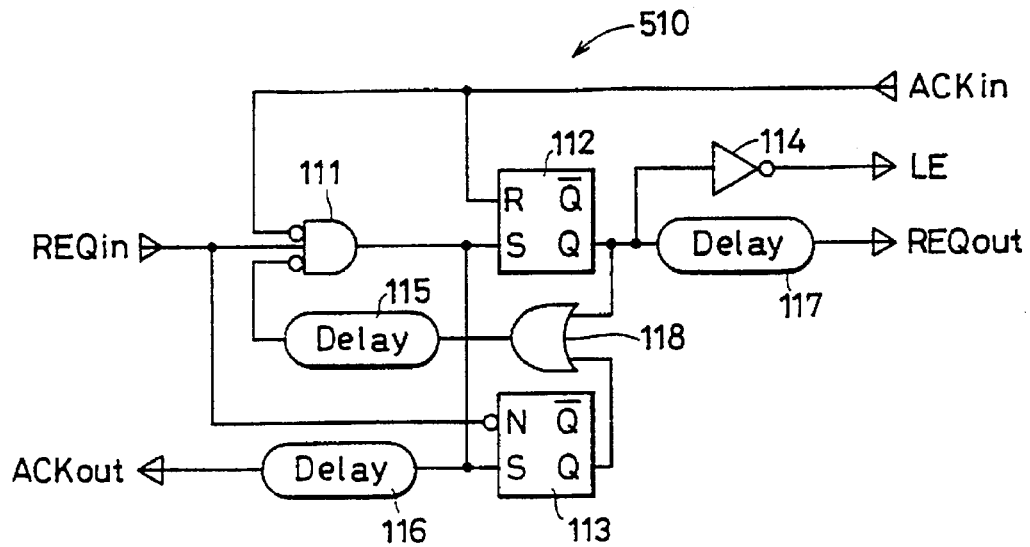
FIG. 9 is a specific circuit diagram of the C element shown in FIG. 7.

FIG. 7 is a block diagram showing an example of a C element for shifting of the shift memories and the destination indicating bit memories shown in FIG. 5. FIG. 8 is a specific circuit diagram of the latch shown in FIG. 7, and FIG. 9 is a specific circuit diagram of the C element shown in FIG. 7. The shift memory 41 and destination indicating bit memory 511 shown in FIG. 5 are constituted by latch circuits as shown in FIG. 7, and L1 to Ln have shifting operation controlled by latch circuit C element 510. More specifically, when data is to be shifted to the preceding stage, a transfer request signal $REQ_0$ is applied to the preceding stage, and if the latch of the preceding stage is empty, a transfer acknowledge signal ACKi is applied to C element 510. When a transfer request signal REQi is applied from the succeeding stage, and the shift memory 41 and destination indicating bit memory 511 are vacant, then C element 510 provides the transfer acknowledge signal ACK0 to the succeeding stage.

Latches L1 to Ln and C element shown in FIG. 7 are structured as shown in FIGS. 8 and 9, respectively. More specifically, latch L1 includes inverters 101, 104, 105 and 106, a p channel transistor 102 and an n channel transistor 103. An LE signal of "H" level is applied to the gate of n channel transistor 103 from C element 510, and it is inverted by inverter 101 and applied to the gate of p channel transistor 102. Accordingly, these transistors are rendered conductive, data is latched in latch circuit constituted by inverters 104 and 105, and the latch output is provided through inverter 106.

C element 510 includes an NOR gate 111, RS flipflops 112 and 113, an inverter 114, an OR gate 115 and delay circuits 116 to 118.

Details of the latch L1 and C element 510 mentioned above are described, for example, in "An Elastic Pipeline Mechanism by Self-Timed Circuits" IEEE JOURNAL OF SOLID STATE CIRCUITS, Vol. 23, No. 1, February, 1988, and therefore description thereof is not given here.

Figure 10:
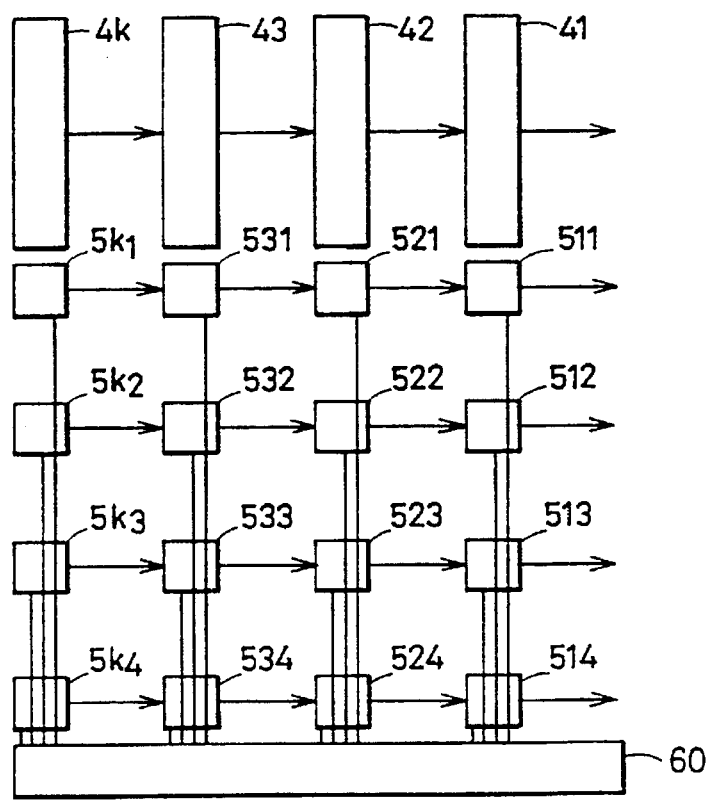
FIG. 10 is a block diagram of another embodiment of the present invention, showing an example in which a searching circuit is shared.
Figure 11:
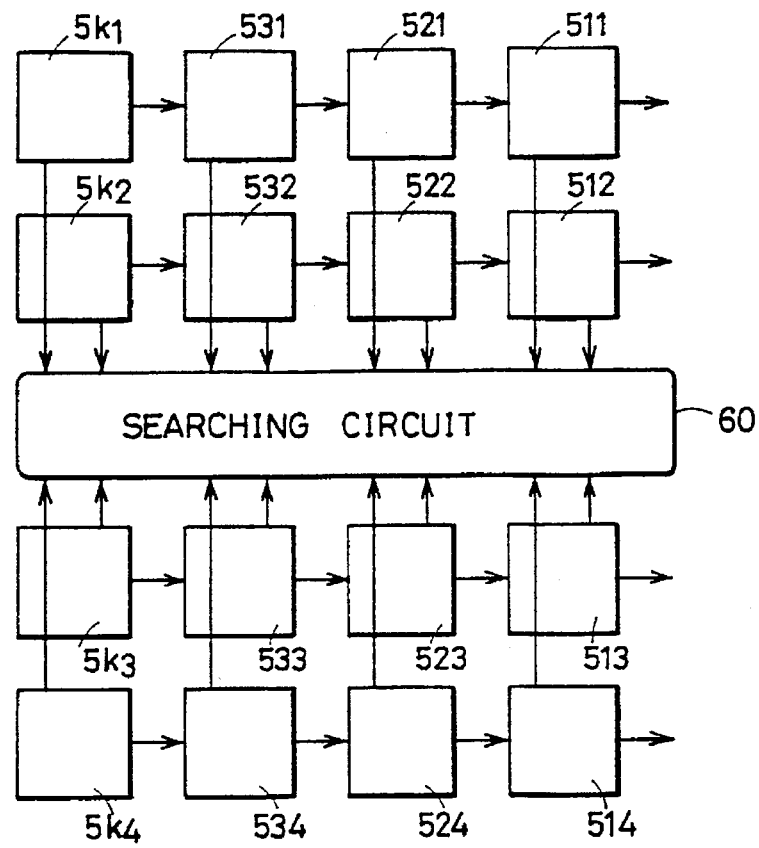
FIG. 11 shows a specific arrangement of destination indicating bits and the searching circuit shown in FIG. 10.

FIG. 10 is a system block diagram of another embodiment of the present invention in which searching circuit is shared, and FIG. 11 shows a specific example of arrangement of the searching circuit and the destination indicating bit memories of FIG. 10.

Referring to FIG. 10, destination indicating bit memories 511 to 5k4 are commonly connected to searching circuit 60, and searching of the destination indicating bits in the destination indicating bit memories 511 to 5k4 is performed by searching circuit 60. In this case, a plurality of interconnections pass over the destination indicating bit memories 512 to 5k4. Generally, when the number of interconnections is increased, the layout area is increased, and the influence is not negligible when a large number of stages must be arranged. In order to relieve this problem, searching circuit 60 is arranged at a central portion amid a plurality of output lines to which it serves, as shown in FIG. 11. In the example shown in FIG. 11, the number of the interconnections passing over the laid out cells of the destination indication bits can be reduced to one half that of FIG. 10, and the maximum length of interconnection from the destination indicating bit memory to the searching circuit 60 can also be reduced to one half. Since the speed of operation and parasitic capacitance can also be reduced, this layout example is advantageous also from the view point of power consumption.

Figure 12:
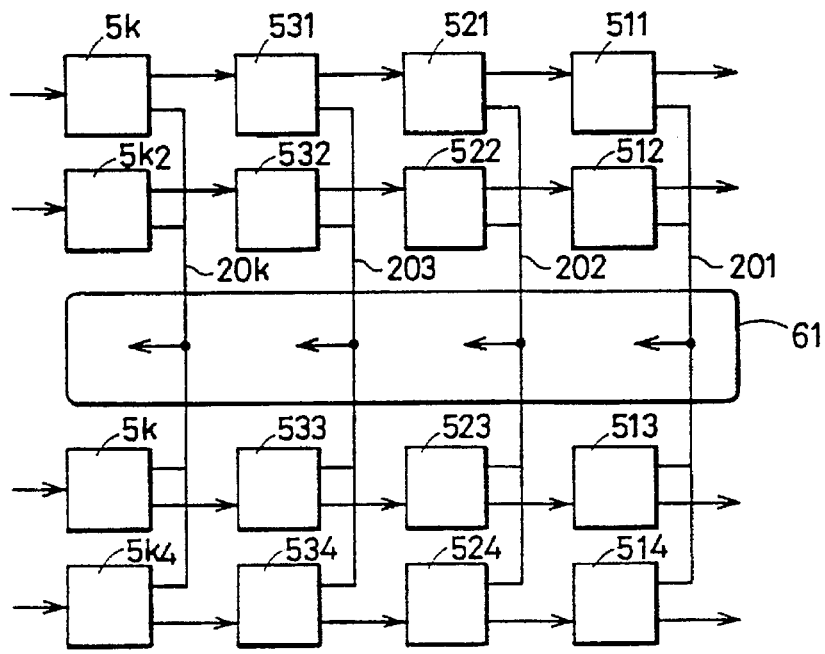
FIG. 12 shows an example in which outputs of destination indicating bit memories are connected to the searching circuit through buses.
Figure 13:
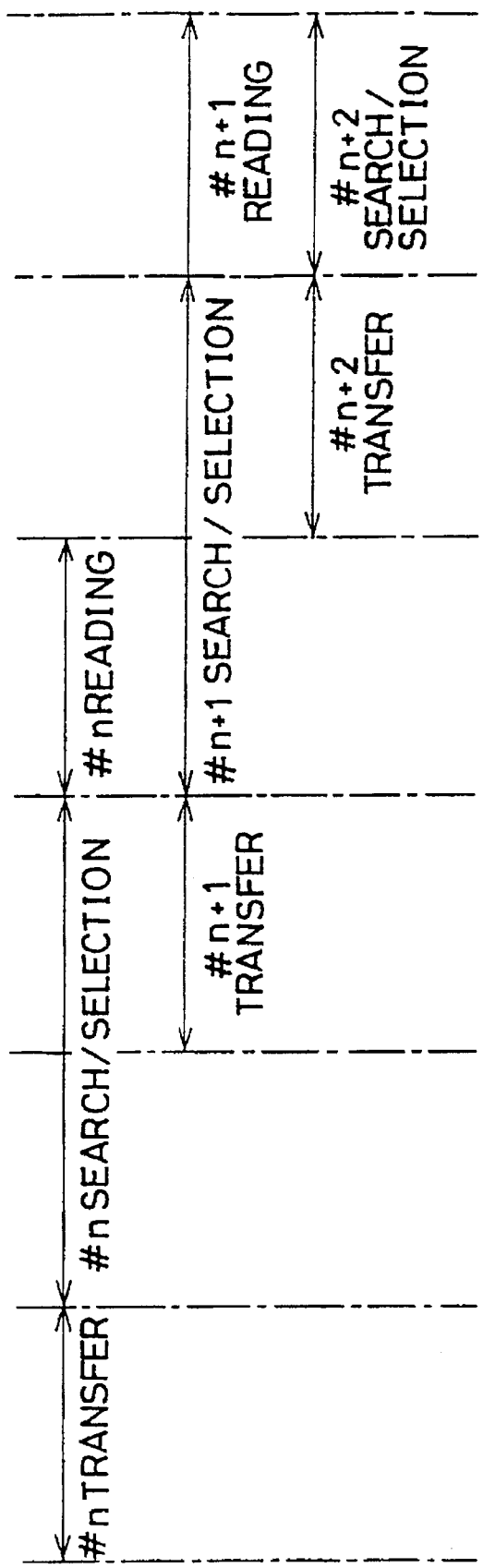
FIG. 13 is an illustration showing the operation procedure of FIG. 12.

FIG. 12 shows an example in which destination indicating bit memories are connected to the searching circuit through buses. FIG. 13 shows the operation procedure of the example shown in FIG. 12.

Referring to FIG. 12, conventional destination indicating bit memories 511–514, 521–524, 531–534, 5k1–5k4 are connected to searching circuit 61 through buses 201–20k, respectively. In this example, since connection between each of the destination of indicating bit memories 511 to 514 . . . to searching circuit 61 can be made by sharing one interconnection and data can be transferred successively, the layout in the direction of stages can be made smaller. Searching circuit 61 searches data successively from the head (the side at which data is input is regarded as the tail or succeeding stage and the destination to which the data is shifted is referred to as the head or the preceding stage), based on the destination indicating bits in the destination indicating bit memories 511–5k4. Searching circuit 61 searches an asserted bit which is closest to the head ("asserted" means "1" in a positive logic and the logic is reversed in the negative logic: when the destination of the destination indicating bit of the stage is the corresponding output line which is being searched, the content of the destination indicating bit is "asserted"). Generally, more than 1 cycle is necessary for searching. If there are larger number of objects to be searched, that is, when the scale of the queue is increased, the time necessary for searching is also increased.

The operation of the embodiment shown in FIG. 12 is shown in FIG. 13. More specifically, destination indicating bit #n of destination indicating bit memory 511 is transferred to searching circuit 61, and while searching is performed by searching circuit 61, destination indicating bit #n+1 of destination indicating bit memory 512 is transferred to searching circuit 61. While reading is performed after completion of inspection and selection of #n, searching and selection of #n+1 takes place. In this manner, since transfer of destination indicating bit to searching circuit 61, searching operation, selecting operation and reading operation can be performed parallel to each other, the time for the transfer to searching circuit 61 can be masked when these operations are performed in pipelined manner, so that higher speed of operation can be attained.

Figure 14:
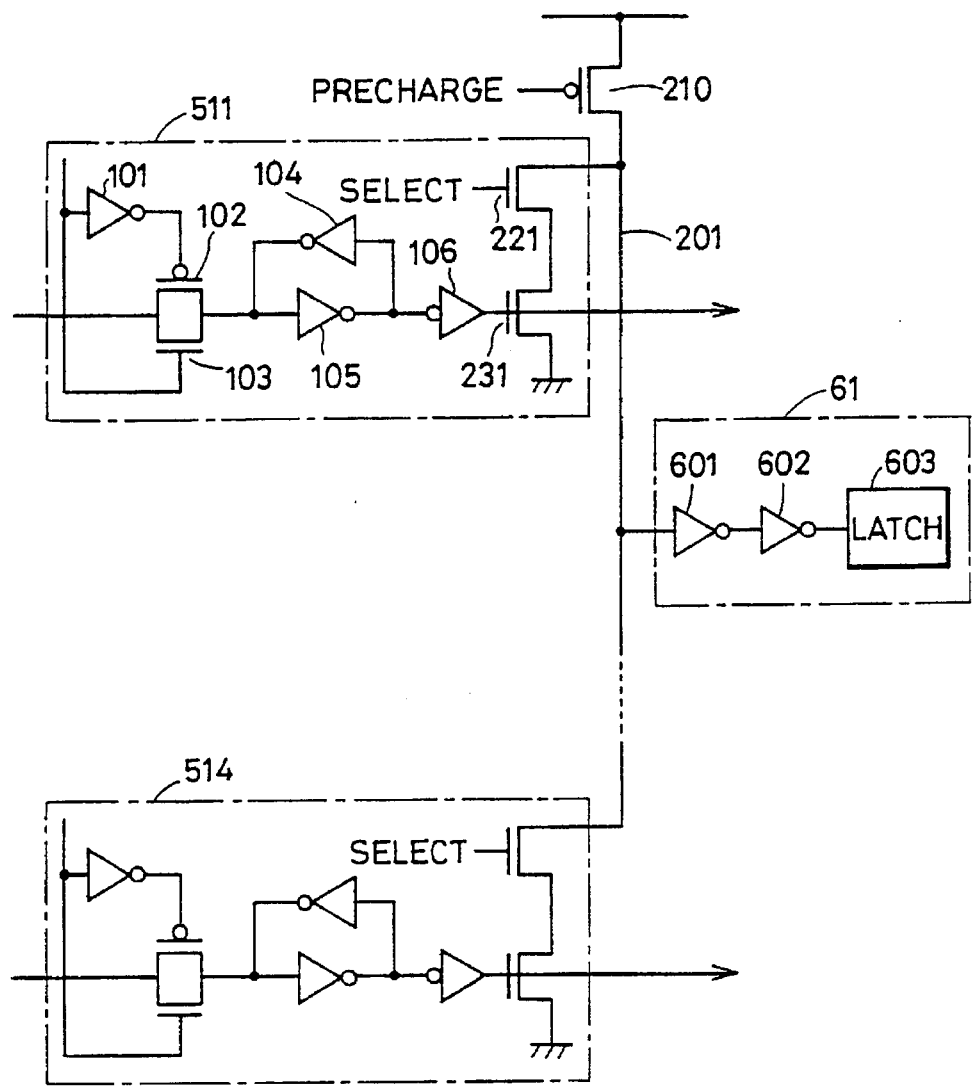
FIG. 14 shows connection between the buses and destination indicating bit memories shown in FIG. 12.

FIG. 14 shows connection between the bus and each of the destination indicating bit memories shown in FIG. 12. Referring to FIG. 14, destination indicating bit memory 511 includes, in addition to the structure shown in FIG. 8, an n channel transistor 231 receiving at its gate the output from latch L1, and an n channel transistor 221 receiving at its gate a select signal. The n channel transistor 221 has its source connected to the drain of n channel transistor 231, and n channel transistor 231 has its source grounded. The n channel transistor 221 has its drain connected to a bus 201, bus 201 is also connected to the drain of p channel transistor 210, and p channel transistor 210 receives at its gate a precharge signal and has its source connected to a power supply line. Bus 201 is connected to an input of an inverter 601 included in searching circuit 61. Inverter 601 has its output connected through an inverter 602 to latch 603. The output from latch 603 is connected to one input and of OR gate 631 shown in FIG. 6. Other destination indicating bit memories 512 to 514 have the same structure.

Figure 15:
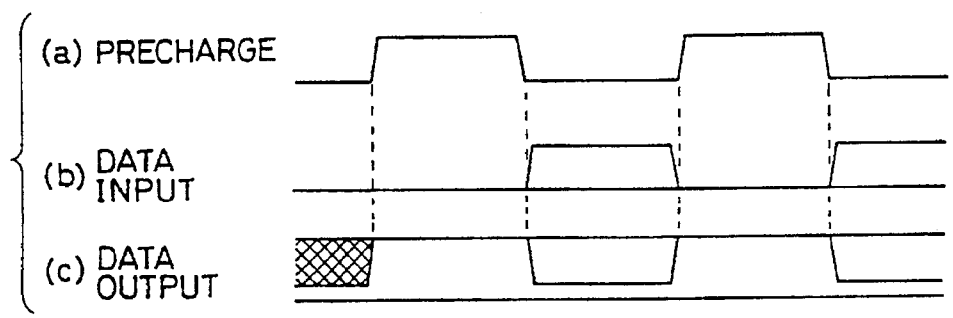
FIG. 15 is a time chart showing the operation of FIG. 14.

Referring to FIG. 15, the operation of the example shown in FIG. 14 will be described. When a precharge signal of "L" level is applied to the gate of p channel transistor 210, p channel transistor 210 is rendered conductive. In response, bus 201 is precharged to the power supply potential as shown in FIG. 15(a). When a select signal is applied to the gate of n channel transistor 221, n channel transistor 221 turns on. When data of "H" level is output from latch R1 as shown in FIG. 15(b), n channel transistor 231 is rendered conductive, and data such as shown in FIG. 15(c) is provided to bus 201.

Meanwhile, inverter 601 of searching circuit 61 receives the data provided to bus 201, and the data is latched in latch 603 through inverter 602. Thereafter, searching operation is performed as described before with reference to FIG. 6.

Figure 16:
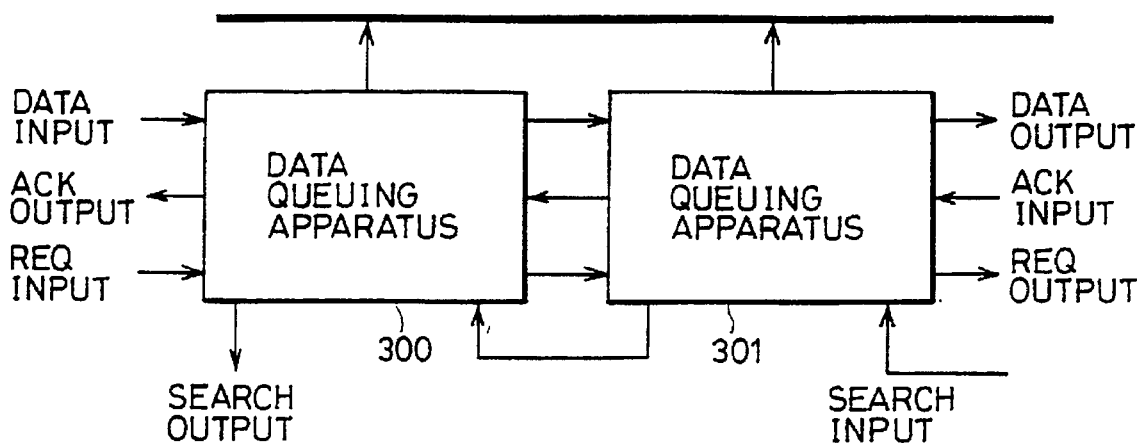
FIG. 16 is a block diagram showing an example in which data queuing apparatuses are cascade-connected.

FIG. 16 is a block diagram showing an example in which data queuing apparatuses are cascade-connected. In the embodiment shown in FIG. 16, data queuing apparatuses 300 and 301 having identical structures are cascade-connected, and transfer of data between queues and transfer of the result of searching from the preceding stage to the succeeding stage are realized by utilizing transfer request signal REQ and transfer acknowledge signal ACK, thus enabling expansion. The data input shown in FIG. 16 corresponds to the input line of FIG. 1, and data output corresponds to the output line. In this example, the transfer request signal REQ is input from the succeeding stage to data queuing apparatus 300, and when a transfer acknowledge signal ACK is transmitted to the succeeding stage, data is input, and transmitted from data queuing apparatus 300 to the data queuing apparatus 301 of the preceding stage, through a cascade output. Meanwhile, the searching input is applied from the preceding data queuing apparatus to data queuing apparatus 301, and further transferred to the succeeding data queuing apparatus 300. More specifically, the searching signal is transmitted in the opposite direction to the flow of data input.

In the embodiment shown in FIG. 16, when too large a number of data queuing apparatuses are cascade-connected, the time necessary for searching is increased proportional to the number of stages. In order to solve this problem, when N stages are cascaded-connected, k (k<N) th and the following stages of data queuing apparatuses may be used simply as FIFOs.

Figure 17:
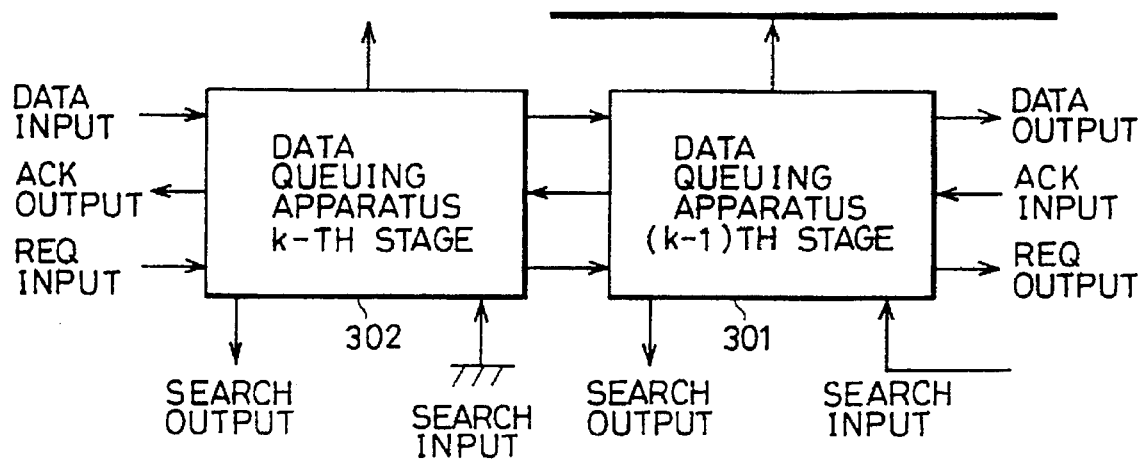
FIG. 17 is a block diagram showing an example in which kth stage of the data queuing apparatus is used as an FIFO.

FIG. 17 is a block diagram showing such an example. In the example shown in FIG. 17, the kth data queuing apparatus 302 is used as an FIFO connected to the data queuing apparatus 301 of the succeeding stage. In this example, the searching input of data queuing apparatus 302 used as an FIFO is grounded, and searching output is not applied from the data queuing apparatus 301 of the succeeding stage. By doing so, the total length of the queue can be enlarged, while the disadvantage of long time necessary for searching data proportional to the total length of the queue can be eliminated as the scope of searching is limited.

As the searching input of queuing apparatus 302 is grounded, when the searching input signal is of negative logic, it means that the data to be read has already been found, and therefore reading operation is not performed in the kth stage.

FIG. 18 is a block diagram showing another embodiment disclosed in U.S. Ser. No. 191,335 mentioned above. The embodiment of FIG. 18 is similar to that of FIG. 1 except the following point. Namely, shift detecting circuits 81 to 8k are provided corresponding to shift memories 41 to 4k. Shift detecting circuits 81 to 8k cause shifting of data to succeeding stages of shift memories 41 to 4k when it is detected that corresponding m destination indicating bits in the destination indicating bit memories 511 to 5km are not asserted at all. For example, shift detecting circuit 82 is provided for the second shift memory 42 and when it detects that corresponding destination indicating bit memories 521, 522, . . . 52m are not asserted, it urges shifting of data to the shift memory 43 of the succeeding stage.

FIGS. 19 to 21 are time charts showing the operation of the embodiment of FIG. 18. Referring to FIGS. 19 to 21, the number of input line 1 is 1, the number of output lines 21–2m is 4, and the number of shift memories 41 to 4k is 6. Changes of stage of various portions are shown. In FIGS. 19 to 21, (a) shows the flow of time on the basis of time slots in the direction of the abscissa, (b) shows examples of data input to input line 1, and (c) represent destination inputs 34, 33, 32 and 31 indicative of the destination of the input data in this order. Reference characters (b) to (u) show examples of the stage of shift memories 41 to 46 and destination indicating bit memories 511 to 564 in respective time slots, and (v) to (y) represent data output to output lines 21 to 24.

In the example shown, it is assumed that data has not yet arrive before time slot 1, or sufficient time has lapsed from the arrival and output of data, so that data does not exist in any of the internal shift memories 41 to 46. One piece of data arrives in each of the time slots 1, 2, 3, 4, 6, 7, 8, 9, 11. In the example shown in FIGS. 19 to 21, reading from output lines 21 to 24 is performed collectively at every 4 time slots. Actually, data are read in time slots 4, 8 and 12.

Simultaneously with the input of data to input line 1, destination bits are input from destination inputs 31 to 34. For example, data h input in time slot 9 has output line 24 as its destination, while destination input 34 is asserted. In the figures, asserted bit is represented by "1". Therefore, destination inputs {34, 33, 32, 31} at this time corresponds to {1, 0, 0, 0}.

When the input data is to be output to a plurality of output lines, that is, when the input data is broadcast data, a plurality of bits of destination inputs 31 to 34 are asserted. For example, data a input in time slot 1 has output lines 21 and 24 as its destination, and destination inputs 31 and 34 are asserted. More specifically, the destination inputs {34, 33, 32, 31} input at this time corresponds to {1, 0, 0, 1}. In time slot 1, data a having output lines 21 and 24 as its destination is input, and in time slot 2, data b having output line 22 as its destination is input. In time slot 1, shift memory 46 is empty, and therefore input data a is shifted immediately. At this time, destination inputs 31 to 34 are fetched in destination indicating bit memories 564 to 561. Similarly, in time slot 2, shift memory 45 is empty, and therefore data a is shifted thereto, and to the shift memory 46 which becomes empty, the data b which is input in this time slot is shifted. Simultaneously with the shifting of data a from shift memory 46 to 45, contents of the original destination indicating bit memories 564 to 561 are shifted to destination indicating bit memories 554 to 551 corresponding to the shift memory 45.

Shift detecting circuits 81 to 86 are provided corresponding to shift memories 41 to 46, and detect a state in which corresponding m destination indications in destination indicating bit memories 511 to 564 are all non-asserted. In the example shown, the state is defined such that it is "1" when there is at least one asserted bit, and it is "0" when there is not an asserted bit. For example, destination indicating bit memories 561 to 564 corresponding to shift memory 46 in time slot 1 are all "0", and therefore the state of shift detecting circuit 86 is "0". Since there is one "1" in destination indicating bit memories 561 to 564 corresponding to shift memory 46 in time slot 2, the state of shift detecting circuit 86 attains to "1".

Reading of data to output lines 21 to 24 will be described. FIG. 19 shows an example in which data are output collectively in time slot 4. In order to output data in time slot 4, searching circuits 61 to 64 search data to be output at the start of time slot 4. When there is an asserted bit in corresponding destination indicating bit memories 511 to 564, it is noticed to the corresponding one of the selectors 71 to 74. Selectors 71 to 74 select one of the shift memories 41 to 46 noticed, and provide data to output lines 21 to 24. For example, data to be output to output line 21 is searched by searching circuit 61. This circuit reads destination indicating bit memories 511, 521, 531, 541, 551 and 561 in this order, and when there is an asserted bit in any of these memories, it is noticed to selector 71. In the shown example, selector 71 selects one from six, and selects one out of six shift memories 41 to 46 in accordance with the instruction from searching circuit 61, and provides the corresponding data to output line 21. The operation for providing data to output line 21 is independent from the operation for other output lines 22 to 24, and therefore these operations can be performed simultaneously and independently.

Destination indicating bit memories 511 to 564 are searched by searching circuits 61 to 64, and when any of these is selected as a result of searching, the asserted bit is erased. Then, shift detecting circuits 81 to 86 determine whether shifting in shift memories 41 to 46 is possible or not, based on the values of the destination indicating bit memories 511 to 564 which are thus renewed. If it is determined that shifting is possible and data exists in the succeeding stage of the corresponding one of the shift memories 41 to 46, the data is shifted from the succeeding stage.

Data output to output line 21 in time slot 4 will be described in detail. In time slot 4, searching circuit 61 reads destination indicating bit memories 511, 521, 531, 541, 551 and 561 in this order. The values of these memories are 0, 0, 0, 1, 0, 1, respectively. When asserted bit "1" is searched in this order, destination indicating bit memory 541 is the first memory having the asserted bit, and therefore it is noticed to selector 71. Selector 71 selects shift memory 44 out of six shift memories 41 to 46 in accordance with the destination from searching circuit 61, and provides data a to output line 21. When data a is provided to output line 21, the asserted bit of the corresponding destination indicating bit memory 541 is cleared. In the similar manner, in time slot 4, searching circuit 64 searches, as data to be output to output line 24, the data a stored in shift memory 44. When data a is output to output line 24, the asserted bit of the corresponding destination indicating bit memory 544 is also cleared.

In time slot 4, destination inputs {544, 543, 542, 541} corresponding to the shift memory 44 in which data a has been stored changes from {1, 0, 0, 1} to {0, 0, 0, 0} as data a is output to output lines 21 and 24, and accordingly, the value of shifted detecting circuit 84 also changes from 1 to 0. When the value of shift detecting circuit 84 changes from 1 to 0, it means that data a existed in shift memory 44 in time slot 4 has been provided to desired destination output lines 21 and 24, and therefore data a is erased.

Similarly, data b is provided to output line 22 in time slot 4. Data c exist in memory 46 which is the succeeding stage of the shift memory 45 in which data b has been stored, and therefore data c is shifted thereto in time slot 5. Accompanying data c, information of destination indicating bit memories 564, 563, 562 and 561 are also shifted to destination indicating bit memories 554, 553, 552 and 551. Since the contents of destination indicating bit memories 513, 523,533, 543, 553 and 563 corresponding to output line 23 are 0, 0, 0, 0, 0, 0 and there is not an asserted bit, searching circuit 62 notices to selector 72 that there is not a data to be output. Therefore, data is not provided from output line 23.

In time slot 5, data is not input to input line. In time slots 6 to 8, data e, f and g are input, respectively. In time slot 8, searching circuit searches for the data to be output. In this case, data c is output to output line 21. Data d is provided to output line 22. Data d is broadcast data to be output to output lines 21 and 22. However, since it is already determined that data c is provided to output line 21, data d is provided only to output line 22. Data e is broadcast data to be provided to all output lines. However, since it has been searched previously that data c and d are to be provided to output lines 21 and 22 in this example, data e is provided to output lines 23 and 24.

In time slot 9, data h is input, and in time slot 10, data is not input. In time slot 10, data d exists in shift memory 41. However, since shift memory 41 is the last stage, data d cannot be further shifted, and remains in shift memory 41 in time slot 11. Data d is output to output line 21 in time slot 12. When data d is output to output line 21, there is not an asserted bit left in the destination indicating bits, and therefore the value of the shift detecting circuit changes from 1 to 0. Therefore, data d is erased.

Figure 22:
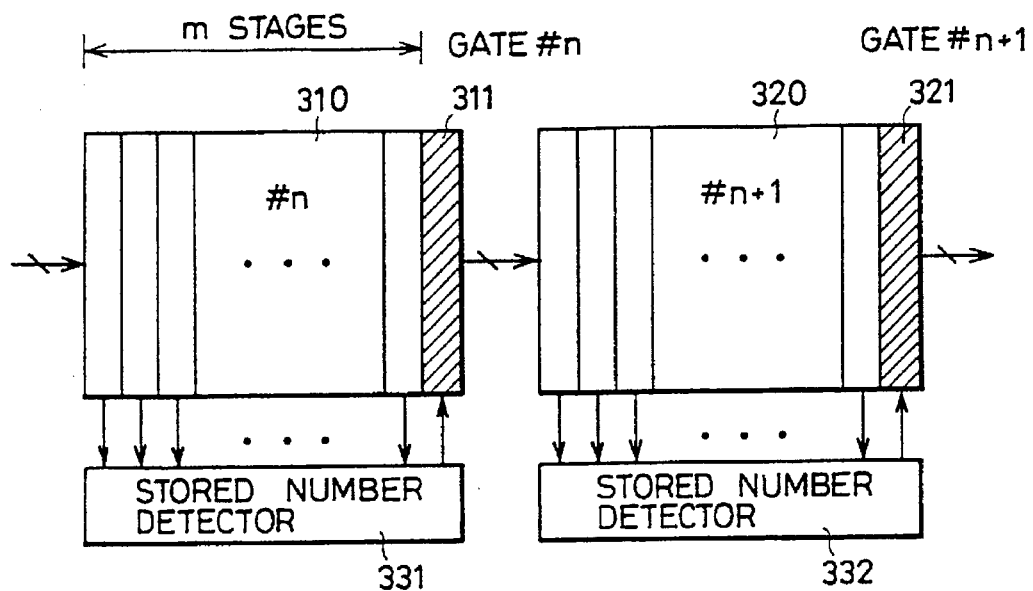
FIG. 22 is a block diagram showing an example in which a gate circuit and a stored number detector are provided at every m stages.

FIG. 22 shows an example in which a gate and a stored number detector are provided at every m stages. Referring to FIG. 22, data queuing apparatus 310 of #nth stage includes shift memories and destination indicating bit memories of m stages, with a gate circuit 311 provided at the head. A stored number detector 331 is provided for detecting the number of valid data stored in each of the m stages. The data queuing apparatus 320 of the preceding stage, that is, #n+1th stage has the identical structure, when it includes a gate circuit 321 and a stored number detector 332.

The operation will be described. Immediately after the start of operation, there is not a valid data in the queue and the queue is empty. In operation, when the queue is under appropriate input load, not match data is kept in the queuing apparatus, and therefore almost all data memories are empty. Therefore, gate circuit 311 of data queuing apparatus 310 of the #nth stage is closed, not allowing passage of data from data queuing apparatus 310 to data queuing apparatus 320 of the preceding stage. In this operation, the lengths of the queue is m. When the load increases and stage occupying ratio of data queuing apparatus 310 (when m stages of m stages are used, the occupation ratio is [M/m×100]%) exceeds 80%, for example, stored number detector 231 detects this excess and opens the gate circuit 311. At this time, the length of the queue is increased to 2m. If the load exceeds 2m, stored number detector 332 opens gate circuit 321.

Meanwhile, when load is once increased and a number of gates are opened and then the load is reduced, the number of data remaining in the queue decreases gradually. This is because the number of data output is larger than the number of data input. However, it is not easy to shorten the once elongated execution queue length. The reason is as follows. Since the speed of shifting operation is limited, data are not all packed at the head of the queue. Since data are input successively, data exist at various positions in the queue. The data remaining in the queue are read to respective output lines successively, from the older ones existing at positions nearer to the head. In order to reduce the length of the queue to the original minimum length, gate circuit 311 is closed when the occupation ratio of data queuing apparatus 310 becomes smaller than 20%, for example. Therefore, of the sparse data existing in the queue, portions where the data is specially sparse is not subjected to transfer until the occupation ratio of the portion exceeds 80%. As a result, the sparse data come to be gradually packed to some portion. When the data distribution is rather sparse and the occupation ratio of the succeeding stage is less than 20%, gate circuit is closed and data is not applied from the succeeding stage, and therefore all data would be read sooner or later, and the portion can be released from the queue. The released state is the state in which the gate circuit is closed, and therefore it does not necessitate any special control.

In the stages, data are shifted and packed to the portion nearer to the head if there is any empty stage, unless the data is selected and read. Therefore, when the queue is long, transfer operation takes place frequently, consuming power. By contrast, in the example shown in FIG. 22, the length of the queue can be controlled dependent on the load. Therefore, power consumed at portions not used can be saved, thus reducing power consumption. At the same time, since the queue is short, the time necessary for searching by the searching circuit can be reduced, and the speed of operation can be improved.

Figure 23:
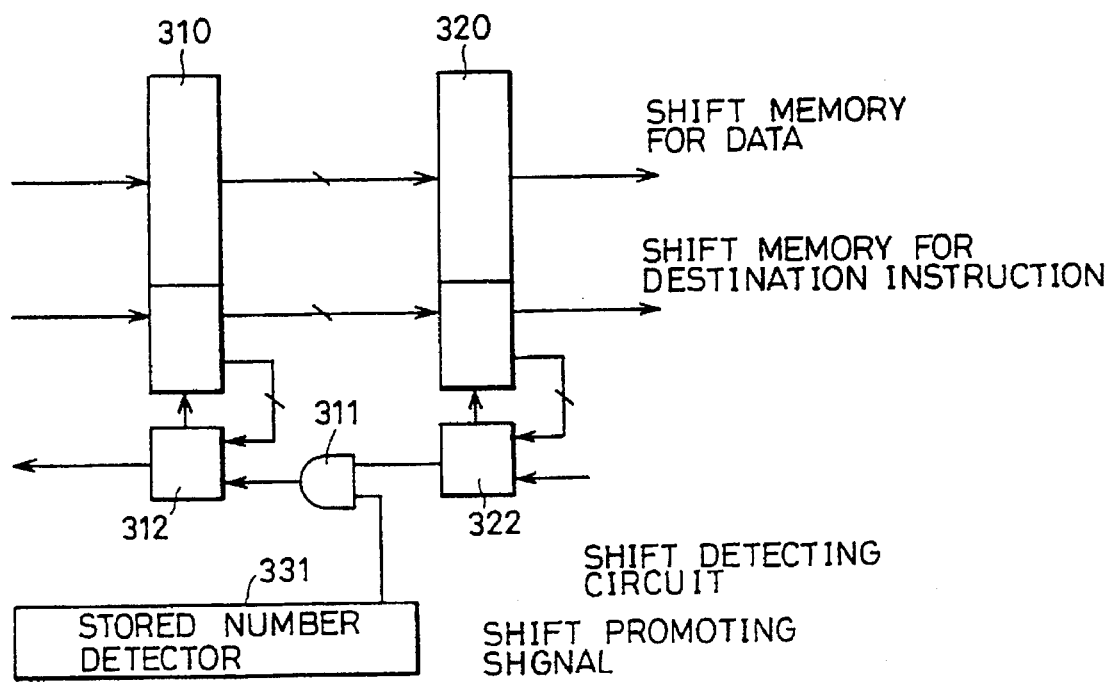
FIG. 23 shows a specific example of the stored number detector shown in FIG. 22.

FIG. 23 specifically shows the interface between each of the stages shown in FIG. 22. Referring to FIG. 23, shift detecting circuits 312, 322 are provided corresponding to respective stages, and shift detecting circuits 312 and 322 transmit a shift promoting signal of the preceding stage to the succeeding stage. Between shift detecting circuits 312 and 322, gate circuit 311 shown in FIG. 22 is inserted. To one input end of gate circuit 311, the shift promoting signal from shift detecting circuit 322 is applied, and to the other input end, a control signal is applied from stored number detector 331. The output from gate circuit 311 is applied to shift detecting circuit 312 of the succeeding stage.

When a shift promoting signal of "H" level is applied from the preceding stage, shift detecting circuit 322 applies the shift promoting signal to gate circuit 311. When prescribed number of effective data are not packed in data queuing apparatus 310 of the succeeding stage, stored number detector 331 applies a "L" level control signal to gate circuit 311, and closes the gate. Accordingly, shift promoting signal is not applied from the preceding shift detecting circuit 322 to the shift detecting circuit 312. Thus, the length of the queue is reduced to m stages, as already described with reference to FIG. 22. When a prescribed number of effective data are packed in the shift memory of data queuing apparatus 310, the control signal attains to "H" level and gate circuit 311 is opened. Consequently, the shift promoting signal is applied from shift detecting circuit 322 to shift detecting circuit 312 of the succeeding stage, and the length of the queue is increased to 2 m.

Figure 24:
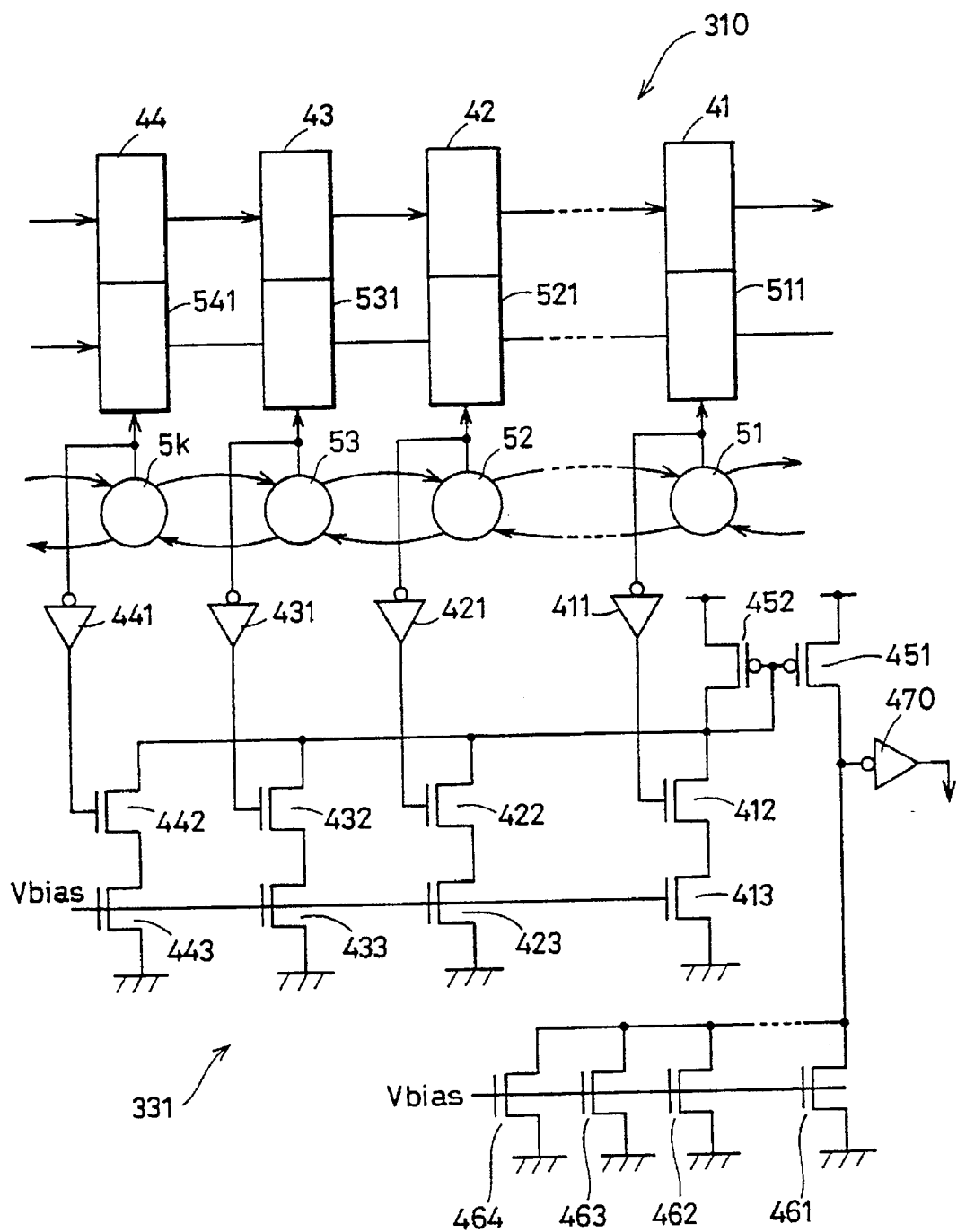
FIG. 24 shows an example employing a shift detecting circuit.

FIG. 24 is a schematic diagram showing an example of the stored number detector shown in FIG. 22. Referring to FIG. 24, shift memories 41, 42 . . . , destination indicating bit memories 511, 512 . . . and C elements 51, 52 . . . are structured in such a manner as described with reference to FIG. 7. A control signal LE provided from C elements 51, 52 . . . is inverted by inverters 411, 412 . . . and applied to the gate of each of n channel transistors 412, 422 . . . Drains of n channel transistors 412, 422 . . . are commonly connected and serve as a current adding node, and connected to the drain and the gate of p channel transistor 452 and to the gate of p channel transistor 451. A power supply voltage is applied to the sources of p channel transistors 452, 451. The n channel transistors 412, 422 . . . have their sources connected to drains of n channel transistors 413, 423 . . . serving as constant current source, respectively, n channel transistors 413, 423 . . . have their sources grounded, and n channel transistors 413, 423 receive at their gates a bias voltage. To the drain of p channel transistor 451, a plurality of n channel transistors 461, 462 . . . serving as reference constant current source are connected, and the input of inverter 470 is further connected. To the gates of n channel transistors 461, 462 . . . , bias voltage is applied.

C elements 51, 52 . . . set control signal LE to "H" when writing of data to shift memories 41, 42 . . . and to destination indicating bit memories 511, 512 . . . is possible. Each C element sets the control signal LE to "L" level, when data of its own is not transmitted to the preceding stage. Therefore, when the number of stages in which control signal LE is at "L" level is counted, the number of stages storing valid data can be determined. More specifically, when the control signal LE output from C element 51 attains to the "L" level, it is inverted to "H" by inverter 411, n channel transistor 412 is rendered conductive, and current I flows to the drain of n channel transistor 412. Therefore, when the number of stages storing valid data is k, the current of kI flows to the current adding node. The p channel transistors 451 and 452 constitute a so called current mirror circuit and the current of kI flows through the drain of p channel transistor 451. This current kI is compared to reference current Iref flowing through n channel transistors 461 to 464, and when kI>Iref, the output of inverter 470 attains to "L" level indicating that the number of storage is larger than R, and if kI<Iref, the output of inverter 470 attains to the "H" level indicating that the number of storage is less than R. Here, R represents the number of n channel transistors 461 to 464.

Figure 25:
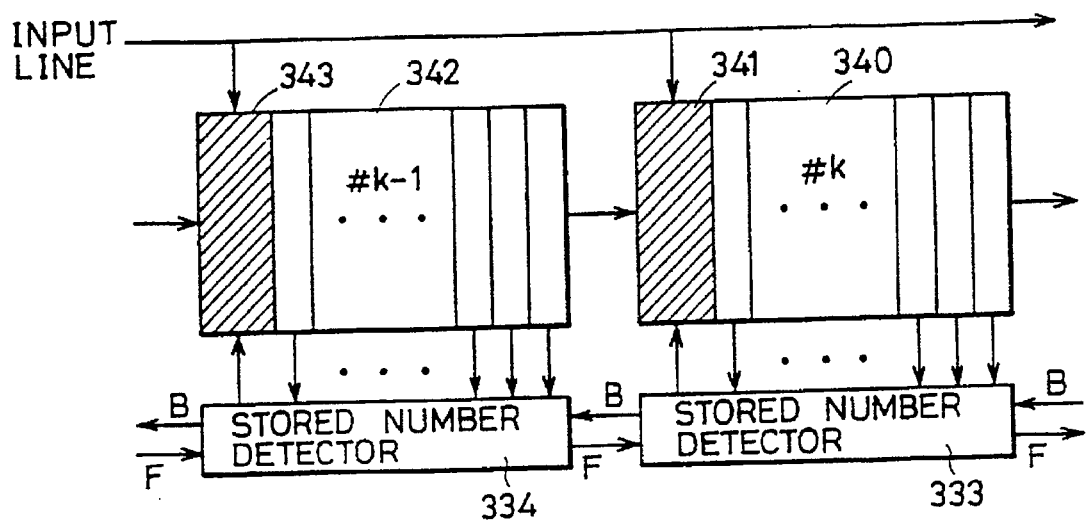
FIG. 25 shows an example of operation in which data is input to the head area n when the queue is empty, and data is input to the next queue when the area n becomes full.

FIG. 25 is a block diagram showing an example in which data is input to the area n at the head of the queue when the queue is empty, and the data is input to the next queue when the area n becomes full. Referring to FIG. 25, to the head stage 341 of data queuing apparatus 340 of #kth stage, data is input through the input line and when data queuing apparatus 340 is almost full with the stored data, data is input to the head stage 343 of data queuing apparatus 342 of #k−1th stage, which is the succeeding stage, through the input line.

To stored number detectors 333 and 334, a signal F indicating that the preceding stage stores more than R data, and an input signal B from each of the stages for checking the stored number in the succeeding stage are applied. When more than R data is stored once in the preceding stage, the input to the area is switched, that is, data is input not from the succeeding stage but from the input line. When the storage number of the succeeding stage exceeds R, a signal F indicating such excess is applied to the succeeding stage, and the input to the area of the stage of interest is switched, that is, the data is input not from the input line but from the succeeding stage. When there is not any data left in the area, the original state is restored, when there is no R. When data is input through the input line at present and data is not left in the area, a signal F for reducing the length of the queue is transmitted to the preceding stage, and input of data is switched from the input line to the succeeding stage. The stored number detector to which the signal F is applied switches the input of data from the succeeding stage to the input line.

Figure 26:
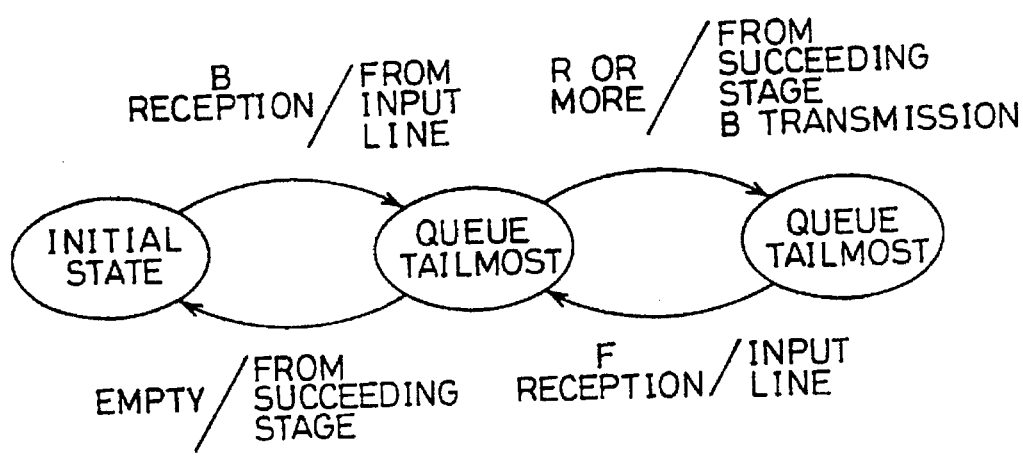
FIG. 26 shows an algorithm related to the operation of the stored number detector shown in FIG. 25.

FIG. 26 shows the operation of the stored number detector shown in FIG. 25 in terms of algorithm.

Referring to FIG. 26, the stored number detector receives data from the input line only when the data is at the tail of the queue. What is necessary for the input switching at this time is the function of a selector for selecting whether the input to the area is to be taken from the input line or from the succeeding stage.

Figure 27:
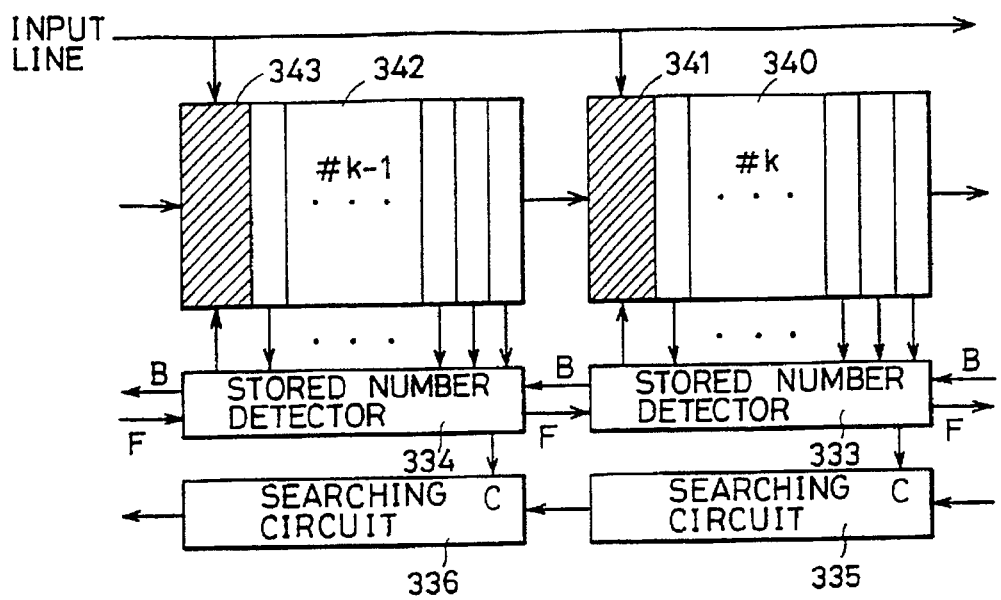
FIG. 27 is a block diagram showing an example of operation in which when a queue is not used in an initial state, searching is invalidated.

FIG. 27 is a modification of the embodiment shown in FIG. 25 made to reduce power consumption of the searching circuit. More specifically, searching circuits 335 and 336 are provided corresponding to stored number detectors 333 and 334. The searching circuits 335 and 336 have the aforementioned OR chain function. Referring to the state transition of FIG. 26, in the "initial state", the queues allotted to the stored number detectors 333 and 334 are not used, and therefore queues following the allotted queues are also un-used. Namely, further search of the following queues is meaningless. Therefore, stored number detectors notice this information to the corresponding searching circuits 335 and 336. More specifically, in the searching circuit utilizing the OR chain, transmission of "1" means that valid data to be read has already been found in the preceding stage. Therefore, in "initial state", C inputs of searching circuits 335 and 336 are set to "1", and the searching is invalidated. The C input is input to the OR circuit of the first stage of the searching circuit for that area. This can accelerate transmission of "1" in searching circuits 335 and 336 in a manner of carry propagation, and therefore the speed of searching can be increased without any specific increase in circuit scale. As for the output of the searching circuit utilizing the OR chain, selection output is obtained by an EXOR of the OR output of the last stage and the OR output of the next stage. However, when "1" is already input from the start, the EXOR input does not change, and power consumption is reduced also from this point of view.

Figure 28:
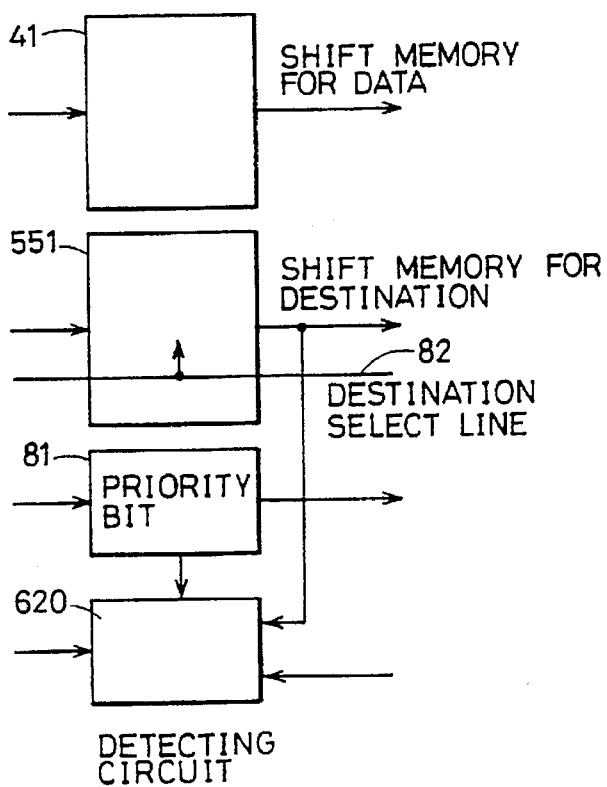
FIG. 28 shows an example in which a bit indicative of delay priority is provided in each stage.

FIG. 28 shows an example in which a bit indicative of a delay priority is provided for each stage. In ATM communication, delay priority generally means allotment of delay priority to input data, so that urgent data can be read quickly from the queue. This allows handling of application such as file transfer which does not necessarily be processed on real time basis and application such as telephone or TV-telephone which require real time processing separately. When two different delay priorities are supported and higher priority is allotted to data of telephone communication, for example, which requires real time processing, then voice data for telephone communication can be passed earlier, over the data of, for example, file transfer which may have been input earlier than the data for telephone communication.

In the embodiment shown in FIG. 28, a bit indicative of the delay priority of the data is provided at its stage, effectively supporting the delay priority.

Referring to FIG. 28, a priority bit memory 81 is provided corresponding to shift memory 41 and destination indicating bit memory 511 for the data, and a destination selecting line 82 for selecting a desired output line from destination indicating bit memory 511 is provided. For example, when destination selecting line #3 for output line #3 is raised, the output of the bit #3 is connected to the input of searching circuit 61.

Figure 29:
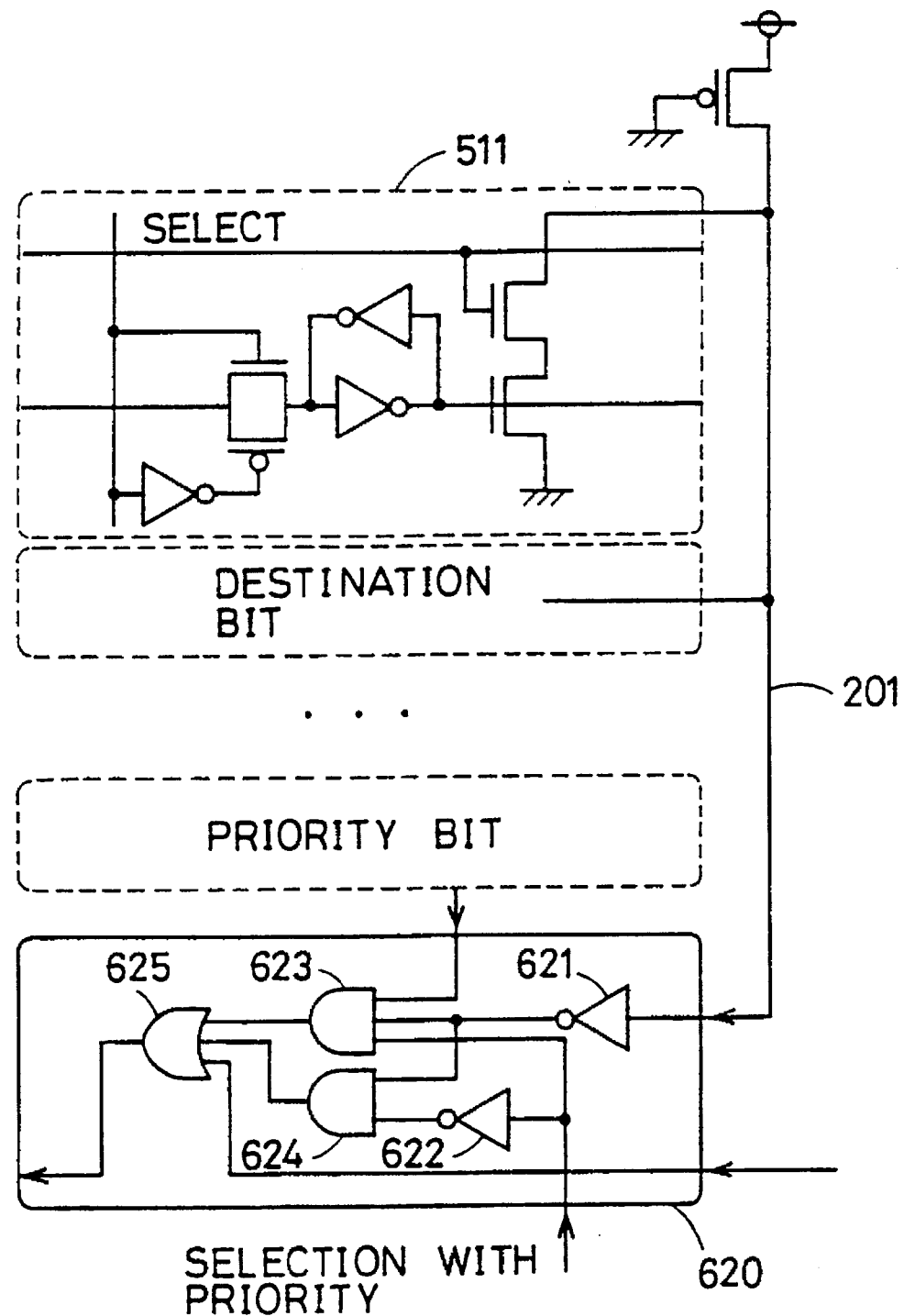
FIG. 29 shows a block diagram showing an example in which a priority selection circuit is provided.

FIG. 29 is a specific circuit diagram of the embodiment shown in FIG. 28. Searching circuit 620 includes inverters 621, 622, AND gates 623, 624 and an OR circuit 625. The bus 201 described with reference to FIG. 14 is connected to inverter 621, and a priority selection signal is applied to inverter 622.

When there is a data with priority existing in the queue, a priority selection signal of "H" level is input, an AND of each destination indicating bit and the priority bit is provided by AND gates 623 and 624, and the result is input to the searching circuit shown in FIG. 6 through OR gate 625. Therefore, the stage to be searched is the stage holding effective data of which destination is the object of searching at present and "1" is set at the priority bit. Of the stages satisfying these conditions, the one closest to the head of the queue is selected. When there is not a data with priority in the queue, the priority selection signal is set to "L" level, and the result of normal selection can be obtained.

Figure 30:
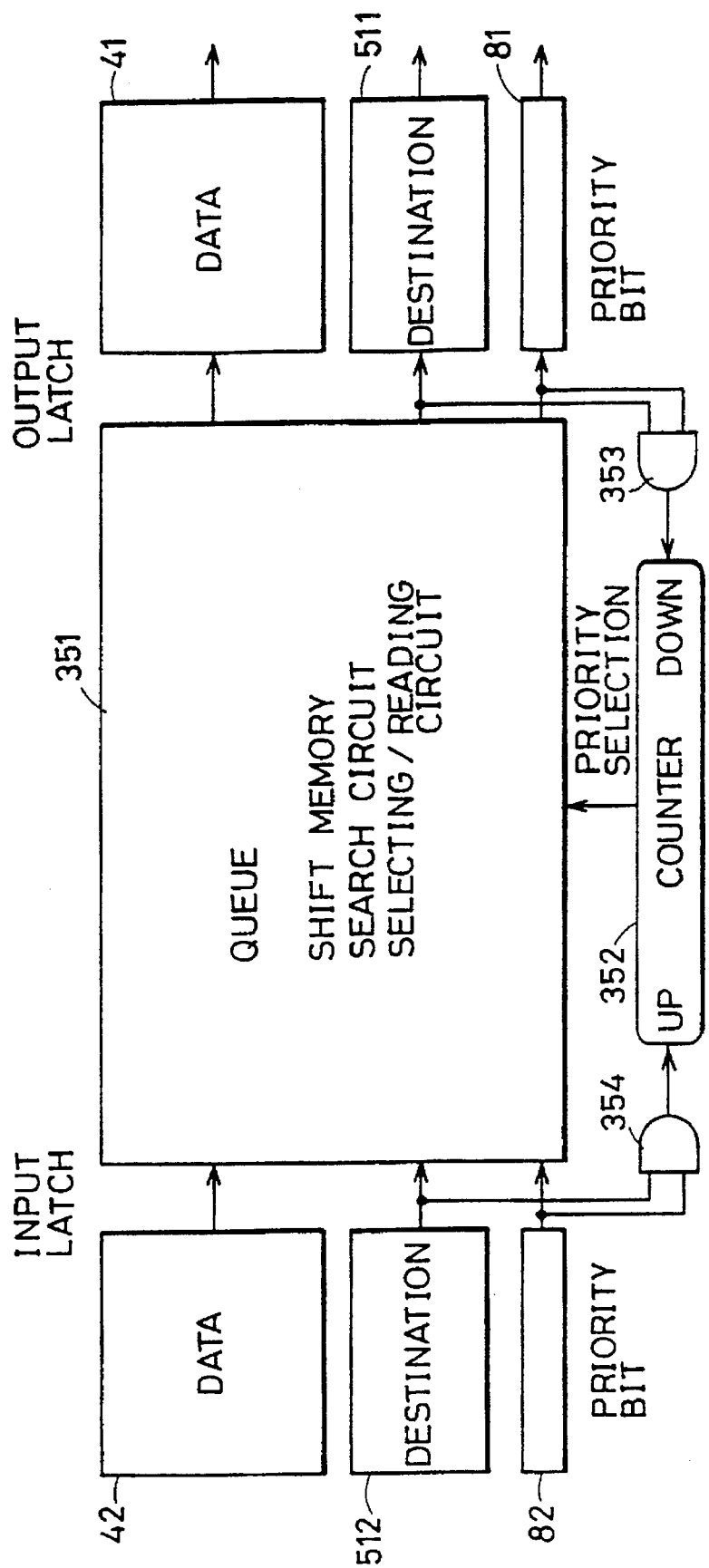
FIG. 30 shows an example in which a counter for priority selection is provided.

FIG. 30 is a block diagram showing another example in which a circuit for determining whether or not a data with priority exists in the queue is provided. Referring to FIG., 30, queue 351 includes shift memories, destination indicating bit memories and searching circuits. Shift memory 41, destination indicating bit memory 511 and priority bit memory 81 are connected to the side of the preceding stage, and shift memory 42, destination indicating bit memory 512 and priority bit memory 82 are connected to the side of the succeeding stage. Further, an updown counter 352 is provided corresponding to queue 351, output from destination indicating bit memory 512 and of priority bit memory 82 on the succeeding stage side are ANDed by AND gate 354, and the result is applied to up input of updown counter 352. The outputs of destination indicating bit memory 511 and of priority bit memory 81 on the side of the preceding stage are ANDed by AND gate 353, and the result is applied as down input of updown counter 352. The output from updown counter 352 is applied to queue 351 as a priority selection signal.

In the embodiment shown in FIG. 30, when data is input to queue 351, AND of the priority bit and the destination indicating bit of the succeeding stage is provided by AND gate 354 and the counter 352 is counted up. Similarly, when data is read from queue 351, the priority bit and the destination indicating bit are ANDed by AND gate 353, and the counter 352 is counted down. In this manner, in the counter 352, the number of data with priority to the corresponding destination stored in queue 351 is stored. If the count value of counter 352 is not 0, priority selection signal is set to "1", and if the count value is 0, the priority selection signal is set to "0".

Figure 31:
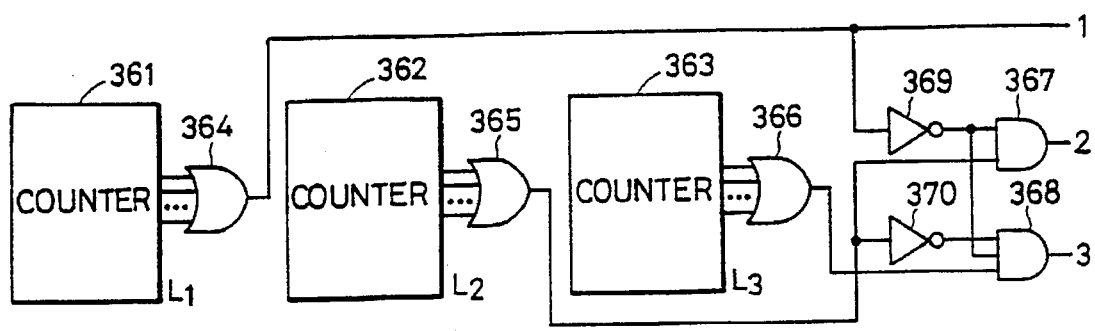
FIG. 31 shows a circuit for providing a priority selection signal in accordance with the degree of priority, when there are a plurality of different priorities.

FIG. 31 shows an example of a circuit which provides priority selection signal in accordance with the degree of priority, when there are a plurality of different priorities. In the example shown in FIG. 29 above, one counter is prepared for one priority bit and one destination indicating bit. When there are a plurality of different priorities, counters 361, 362 and 363 corresponding to respective priorities are provided. In the example of FIG. 31, the output of counter 361 has the highest priority. The plural bits of outputs from counter 361 are ORed by OR gate 364, and provided as a signal having highest priority. Counter 362 has the second highest priority, the outputs therefrom are ORed by OR gate 365, and the result is applied to one input end of AND gate 367. To the other input end of AND gate 367, the output from OR gate 364 is applied, inverted by inverter 369. Further, counter 363 has the third highest priority, the outputs are ORed by OR gate 366, and the result is applied to AND gate 368. To one input end of AND gate 368, the output from OR gate 365 is applied inverted by inverter 370, and to the other input, the output from inverter 369 is applied. By combining logic circuits in this manner, one of the priority selection signals attains to "1" and others attain "0", in accordance with the priority.

Figure 32:
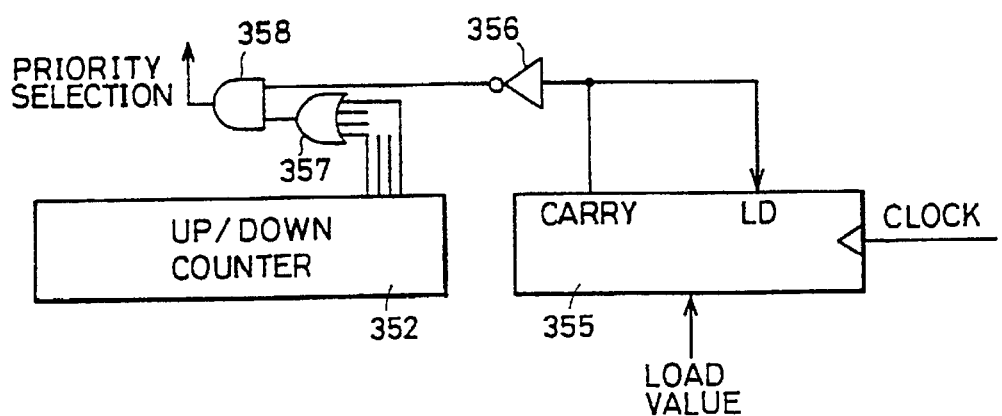
FIG. 32 shows an example in which data with low priorities are output at a prescribed ratio.

FIG. 32 shows an example in which even data having low priority are processed at a prescribed ratio. In each of the above described embodiments, data having high priority are always processed earlier. However, in some cases, it is preferred to process data with low priority at a prescribed low ratio. The reason for this is that it is possible that data having low priority may be stored in large amount in queue 351 in order to process data with high priority first, and in that case it is possible that the receiving side may erroneously recognize the storage of the large amount of data in the queue as an error. In order to prevent such event, a counter 355 is provided separate from counter 352 as shown in FIG. 32, the separate counter 355 counts internal clock signals, and when a carry output is obtained, it inverts the carry output by inverter 356 and closes AND gate 358. As the AND gate 358 is closed, the priority signal from OR gate 357 providing OR of the output from counter 352 is not applied to queue 351, so that data of low priority are read at a prescribed ratio. Counter 355 continues counting starting from the load value to the maximum number. Therefore, by appropriately setting the load value, the ratio of reading of data having low priority can be arbitrarily set as needed.

Figure 33:
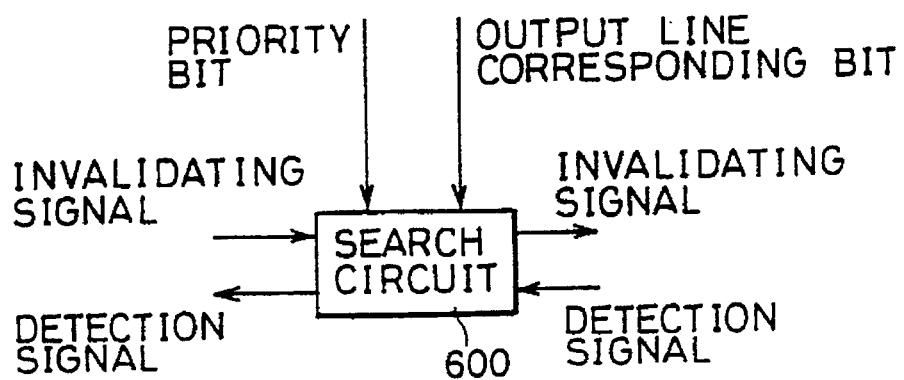
FIG. 33 shows another example of a detecting circuit for detecting the priority.

FIG. 33 is a block diagram showing another example of the detecting circuit for detecting the priority.

In the example shown in FIG. 33, an invalidating signal is applied to detecting circuit 600, and when there is data to be read in the corresponding stage, it sends a detecting signal to the succeeding stage regardless of the priority, and if there is a data to be read with high priority, it transmits an invalidating signal to the preceding stage. When the detecting signal is received, the detecting signal is transmitted to the succeeding stage, and when the invalidating signal is received from the succeeding stage, the invalidating signal is transmitted to the preceding stage. At the same time, when there is data to be read with low priority, it stops outputting the detecting signal, while permits transmission of the detecting signal from the preceding stage. When it has data to be read with high priority, then it does not perform any special operation. When there is not any data to be read, it does not perform any special operation, either.

Figure 34:
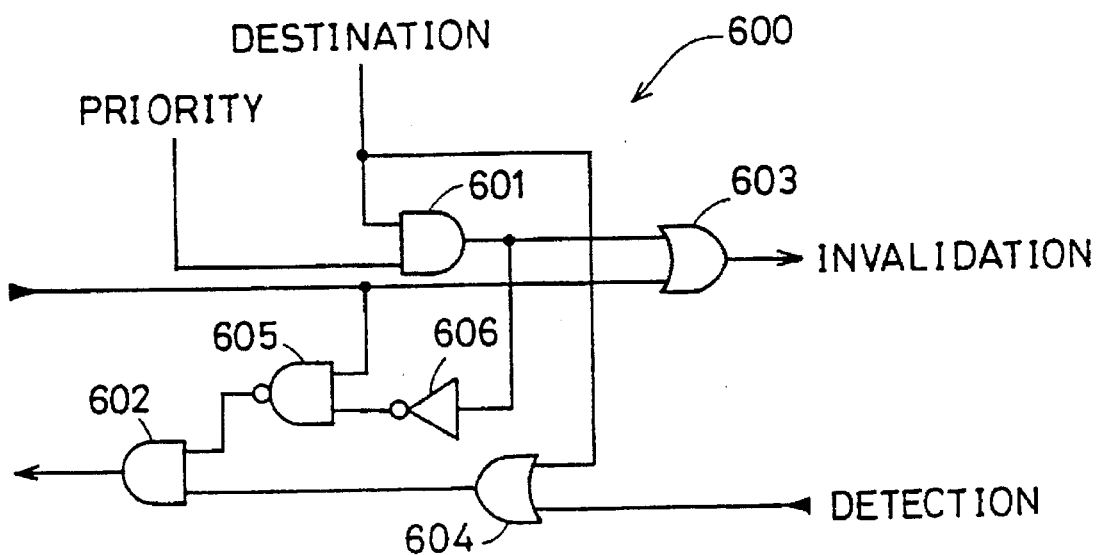
FIG. 34 is a specific circuit diagram corresponding to FIG. 33.

FIG. 34 is a specific circuit diagram of the detecting circuit shown in FIG. 33. Detecting circuit 600 includes AND gates 601 and 602, OR gates 603 and 604, an AND gate 605 and an inverter 606. The above described operation can be performed by such logic circuits.

Figure 35:
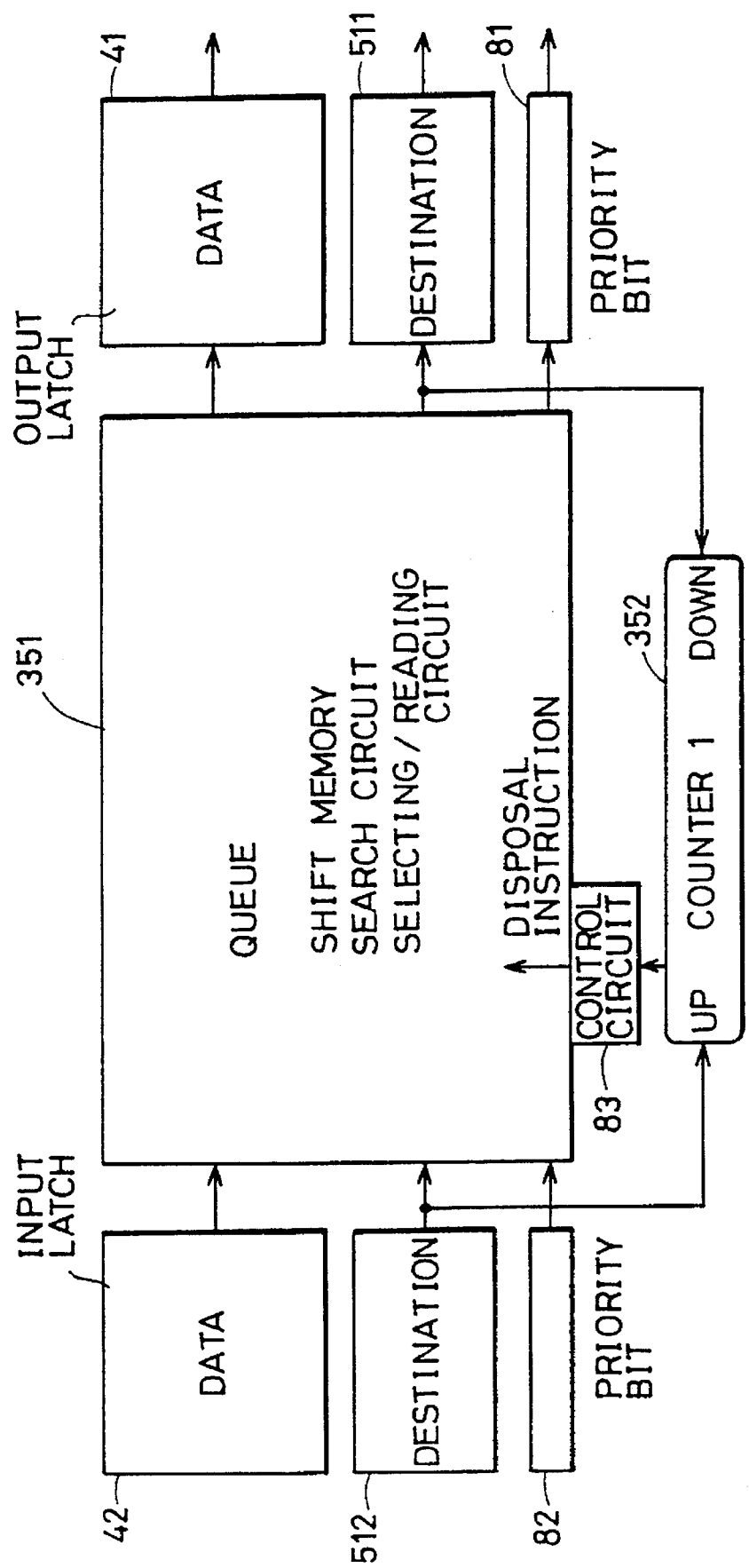
FIG. 35 shows an example in which data with low priority stored in the queue can be collectively discarded.

FIG. 35 is a block diagram showing an example in which data with low priority stored in the queue can be collectively disposed. Disposal priority means an operation of disposing data with low priority when buffer in the apparatus such as exchanger becomes full and about to be overflown, so as to prevent malfunction of the apparatus as a whole, or to prevent trouble in communication of data having high priority. In conventional delay priority processing, when the buffer becomes full, of the data arriving at the apparatus, those with low priority are not accepted. The output of destination indicating bit memory 512 is applied to UP input of counter 352, and destination indicating bit output from queue 351 is applied to DOWN input of counter 352. Counter 352 counts up every time the destination indicating bit is input to queue 351, and it counts down when the destination indicating bit is output from queue 351. Therefore, in counter 352, the number of valid data stored in queue 351 is stored. When the value of the counter 352 exceeds a predetermined threshold value, control circuit 83 provides a disposal instruction to queue 351. Upon reception of the disposal instruction, queue 351 clears the stage storing the data with low priority, in accordance with an AND of the priority bit (in this case, not the delay priority bit but the disposal priority bit) and the signal of disposal instruction. As a specific method of clearing, all the destination indicating bits may be cleared, or the C element shown in FIG. 9 above may be cleared.

Meanwhile, when the counter 352 shown in FIG. 35 is preferred for each shift memory, the information with respect to the occupation ratio of the queue for each output line can be obtained.

Figure 36:
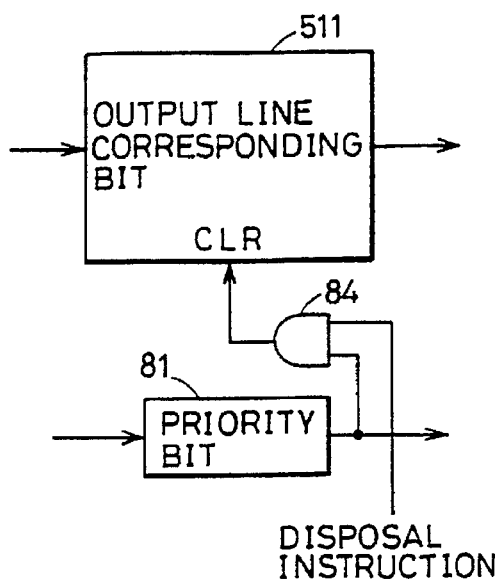
FIG. 36 shows clearing of data with low priority.

FIG. 36 is a block diagram showing an example in which the destination indicating bit memory is cleared in accordance with the disposal instruction. In order to obtain an AND of the output of priority bit memory 81 and the disposal instruction, an AND gate 84 is provided. The output of AND gate 84 is input to a clear terminal of destination indicating bit memory 511. By this structure, only the data with low priority of a certain output line can be cleared.

Figure 37:
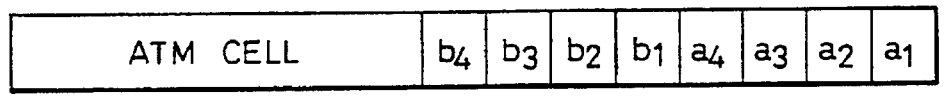
FIG. 37 shows an example in which the scale of switching is expanded by using the queue of the present invention.
Figure 38:
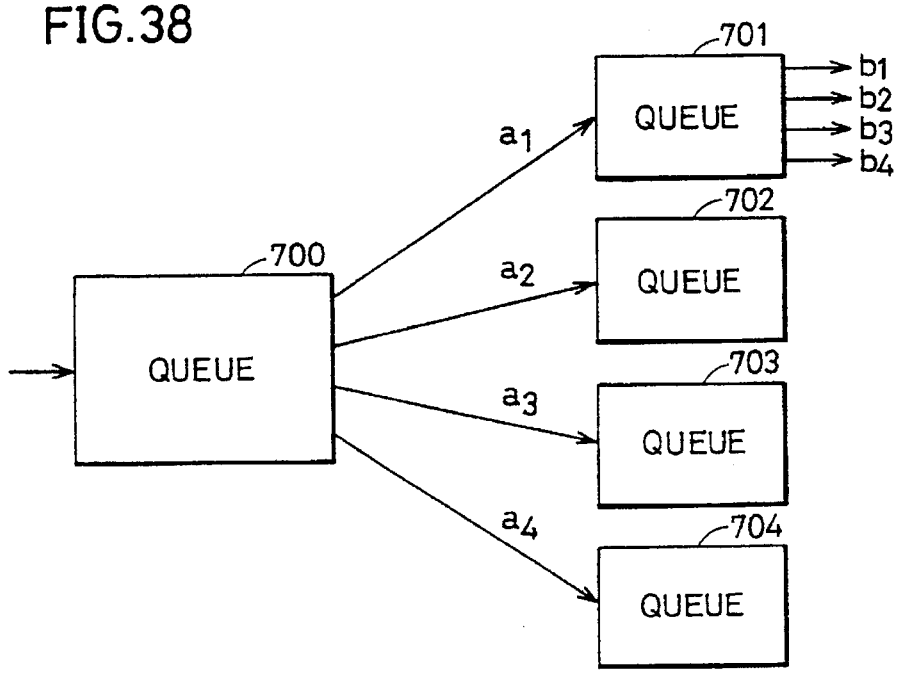
FIG. 38 shows an example in which queues are connected in the form of a tree.

FIG. 37 shows an example in which the scale of the switch is enlarged by using the queue of the present invention, and FIG. 38 shows an example in which the queues are connected in a tree.

Referring to FIG. 37, routing headers a1 to a4 and b1 to b4 are added in a hierarchy, to the ATM cell. Routing headers a1 to a4 are indicating bits for identifying a plurality of groups. The ATM cell is input to a queue 700 of the first stage shown in FIG. 38. Queue 700 is switched with reference to the routing headers a1 to a4 added to the ATM cell, and it is output to the corresponding one of the queues 701 to 704 of the second stage. Queue 701 switches with reference to routing headers b1 to b4, and provides the ATM cell to each of the routing headers b1 to b4. Therefore, in the example shown in FIG. 38, signals can be transmitted to 16 destinations by using a queue having four destinations. The example of FIG. 38 is constituted by two stages, that is, the first stage of queue 700 and the second stage of queues 701 to 704. However, the switching process can be further expanded by increasing the number of stages of the queues.

Figure 39:
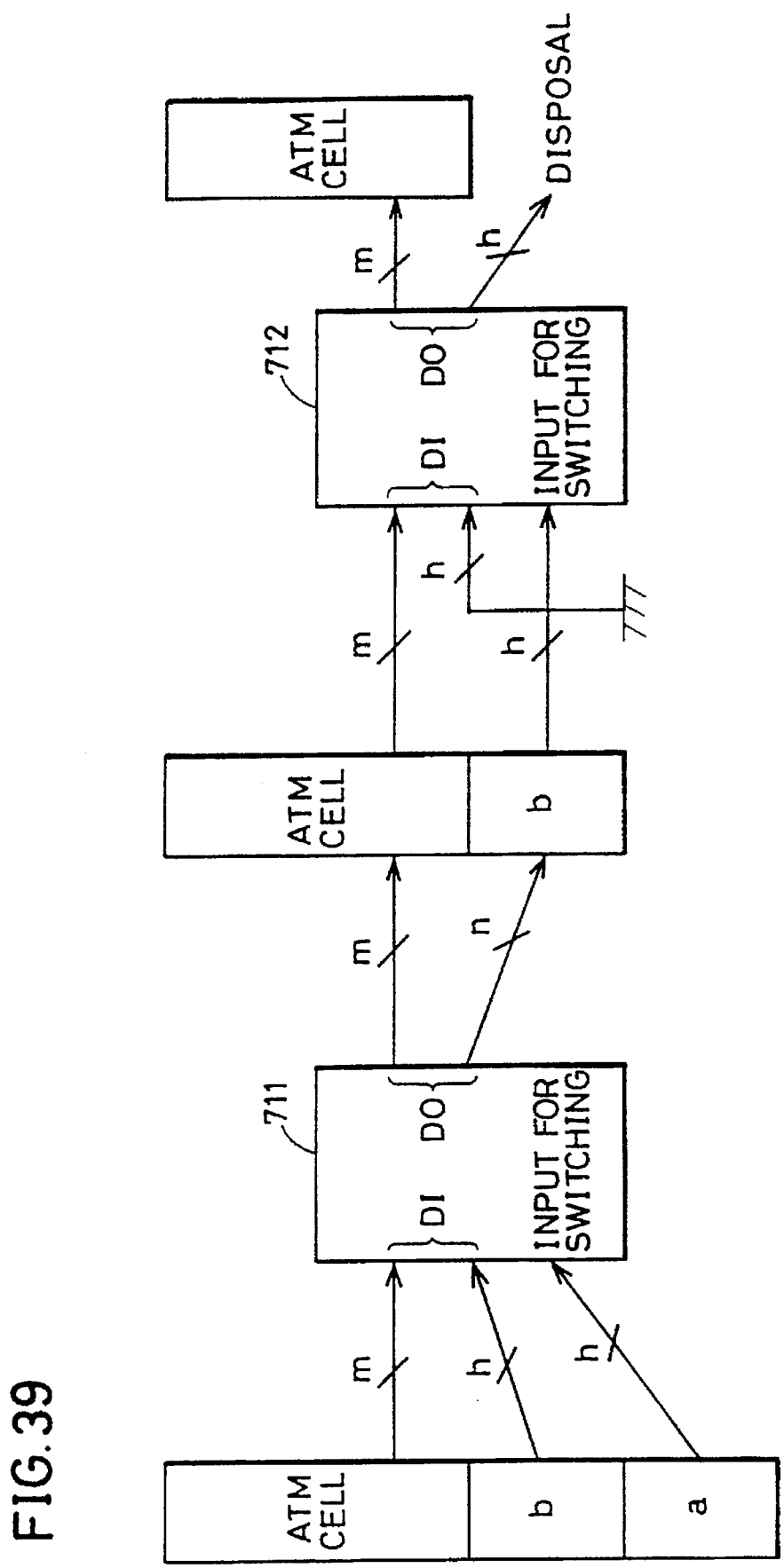
FIG. 39 shows an example in which hierarchical routing headers and tree connection are combined.

FIG. 39 shows an example in which hierarchical routing headers and the tree connection are combined. In this embodiment, queue 711 switches with reference to routing header a, and queue 712 switches with reference to routing header b. When the bit width of ATM cell is m, the bit width of routing header b is h and the bit width of destination bit a is h, then ATM cell and routing header b are input to data input terminal DI of queue 711, and destination bit a is input to switching input terminal of queue 711. Queue 711 handles routing header b as data, and switches with destination bit a. Since queue 711 has switched with reference to destination bit a, it applies the ATM cell and the routing header b except destination bit a as outputs to the queue 712 of the next stage. To data input terminal DI of queue 712, an ATM cell of m bits is applied. However, of the data input terminal DI, the input of h bits are grounded, and routing header a is applied to the switching input terminal. Therefore, queue 712 switches regarding routing header a as destination bit, and provides the ATM cell. Queue 712 discards the bits of the data input terminal DI which are grounded.

In this embodiment, common hardware may be used for the queues 711 and 712. Though this embodiment is constituted by two stages, the hierarchy can be increased by increasing the routing headers and connecting the queues in accordance with this example.

Figure 40:
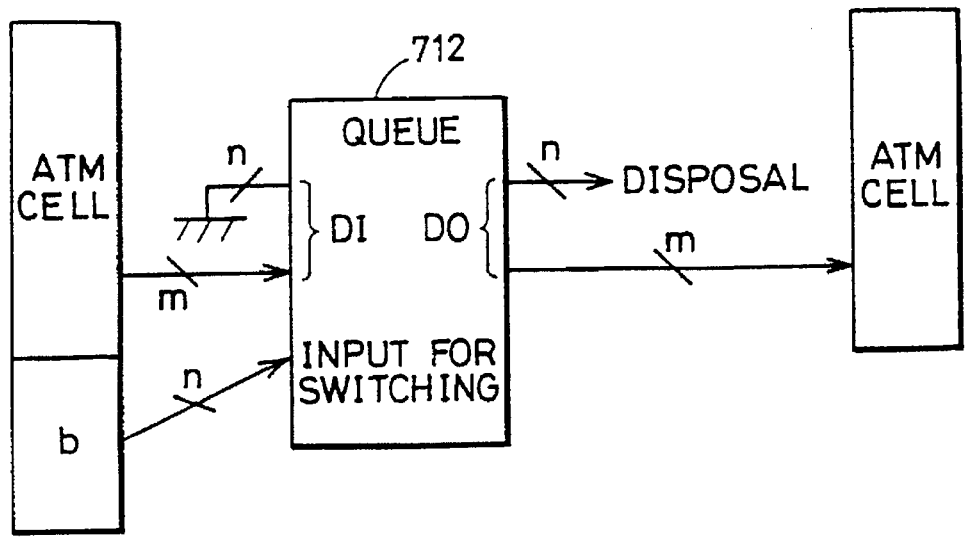
FIG. 40 shows an improvement of the embodiment shown in FIG. 39.

FIG. 40 shows an improvement of the embodiment shown in FIG. 39. Referring to FIG. 39, h bits of input terminal are grounded among the data input terminal DI. However, there would be a crossing with the outputs from the routing header. In order to avoid this problem, a complicated interconnection must be provided. Therefore, in the example shown in FIG. 40, of the data input terminals DI, the terminals furthermost from the switching input terminal are grounded so as to avoid crossing with other lines, so that interconnection can be facilitated.

Figure 41:
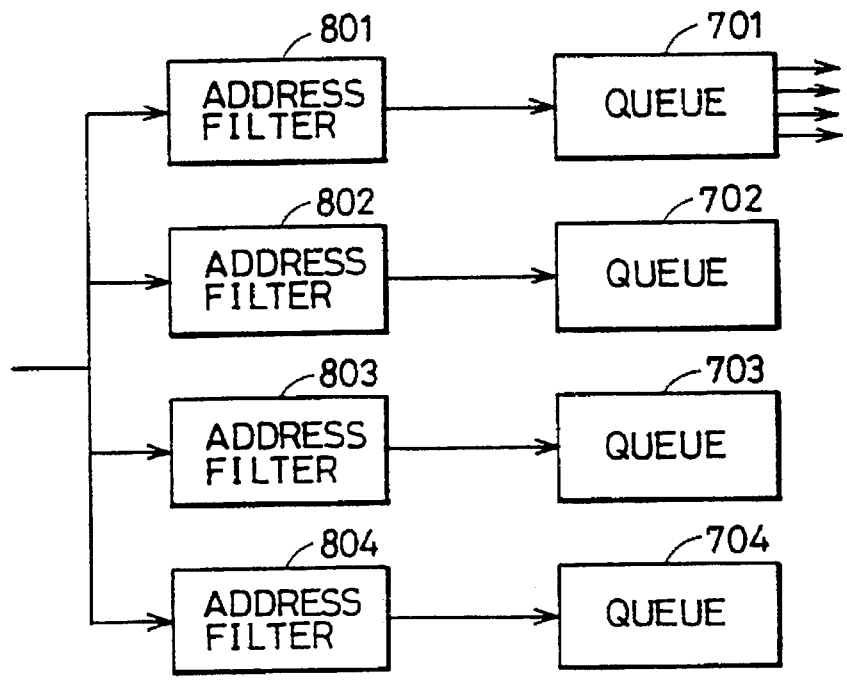
FIG. 41 shows an improvement of the embodiment shown in FIG. 38.
Figure 42:
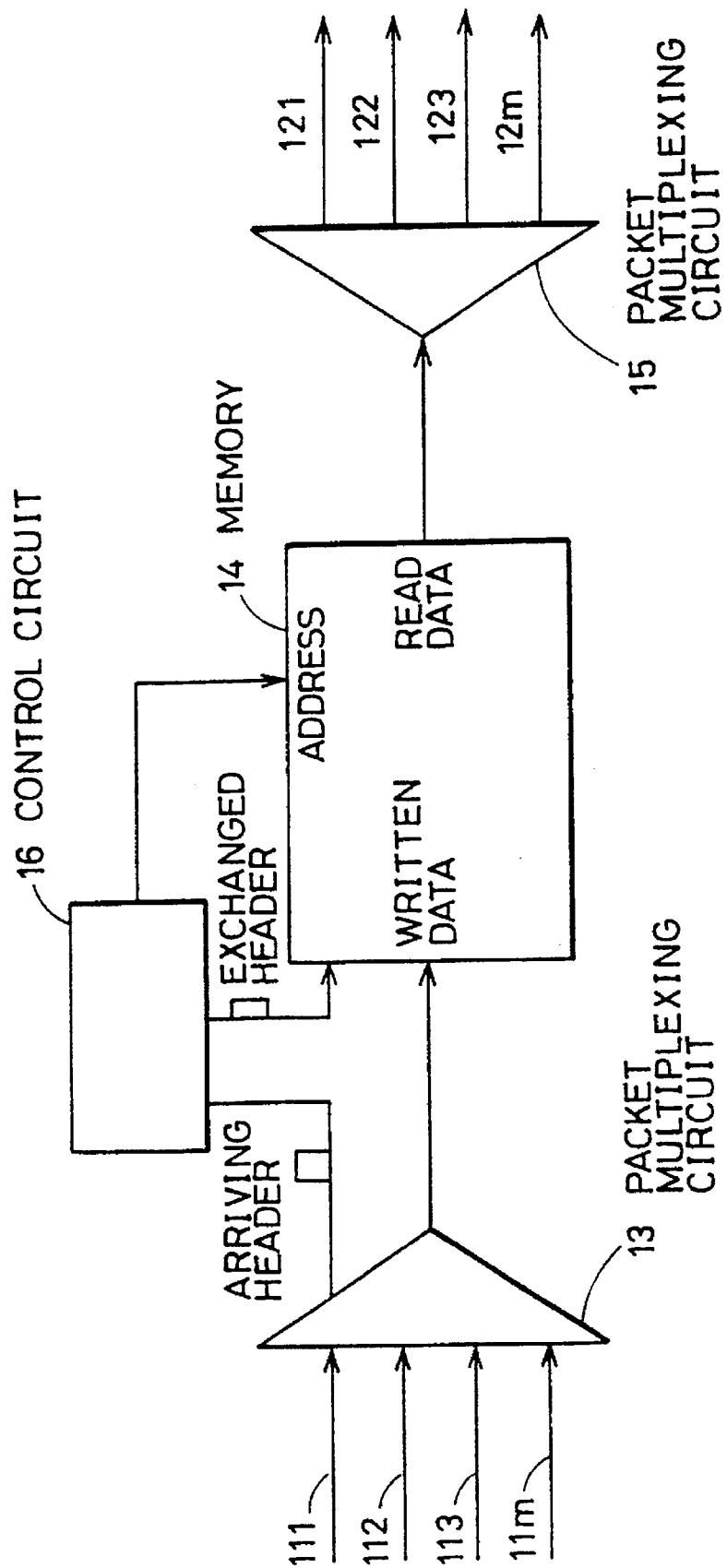
FIG. 42 shows a conventional high speed packet switch including a data queuing apparatus.
Figure 43:
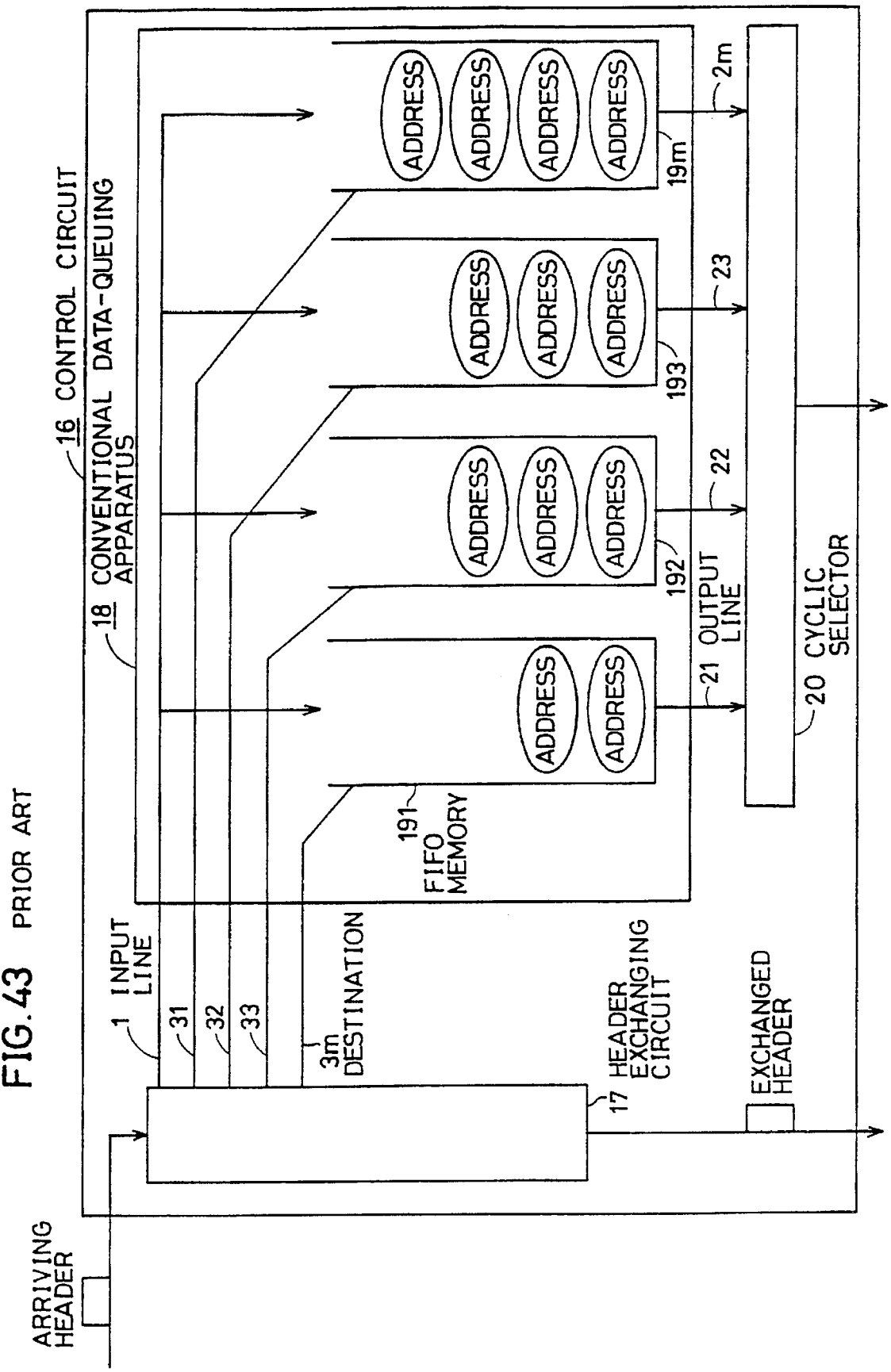
FIG. 43 is a block diagram showing a conventional data queuing apparatus.

FIG. 41 shows an improvement of the embodiment shown in FIG. 38. In the example shown in FIG. 38, there is provided a queue 700 in the first stage, and a plurality of queues 701 to 704 are provided in the second stage. In this embodiment, in place of queue 700 of the first stage, address filters 801 to 804 are provided. Address filters 801 to 804 refer to the routing headers a1 to a4, respectively, and provides only the corresponding cells. More specifically, address filter 801 output the cell having the routing header a1, address filter 802 outputs the cell having routing header a2, address filter 803 outputs the cell having routing header a3, and address filter 804 outputs the cell having routing header a4, to the queues 701 to 704, respectively. Therefore, in this embodiment, signals can be transmitted to 16 destinations by using four queues having four destinations.

In the above described embodiment also, the ATM switch was constituted by two stages, that is, the first stage of address filters 801 to 804 and the second stage of queues 701 to 704. However, the scale of switching can be enlarged by increasing the hierarchy of the routing headers and increasing the number of stages of the queues.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data queuing apparatus, comprising
   a plurality of stages of cascade-connected data queuing portions, each including a plurality of data shift means each shifting while holding data, a plurality of destination indicating bit storing means provided corresponding to said respective data shift means for storing destination indicating bits indicative of destinations of said data, and searching means for searching said plurality of destination indicating bits and for outputting the searched data; wherein
   each data queuing portion receives data and destination indicating bit from a succeeding stage, and when a preceding stage is empty, outputs the data and the destination indicating bit to said empty preceding stage.

2. The data queuing apparatus according to claim 1, further comprising
   a bus for commonly connecting data reading outputs of said respective data queuing portions.

3. The data queuing apparatus according to claim 2, wherein of said plurality (N) of stages of data queuing portions, kth (k<N) and subsequent stages are used as first in first out memories which do not perform searching or reading.

4. The data queuing apparatus according to claim 3, wherein
   said kth and subsequent stages of data queuing portions do not provide read output to data queuing portion of the stage prior to kth stage.

5. The data queuing apparatus according to claim 3, wherein
   a search input signal indicating the validity is applied to said kth and subsequent stages of data queuing portions.

6. The data queuing apparatus according to claim 1, further comprising
   AND means responsive to application of an instruction for disposing data with priority, for providing an AND of the instruction and said priority bit and for clearing data of the corresponding data queuing portion.

7. The data queuing apparatus according to claim 6, further comprising
   a counter provided for each data queuing portion, incremented every time data is input to the corresponding data queuing portion and decremented every time data is output from the corresponding data queuing portion, wherein data with low priority is disposed when count value of the counter reaches a prescribed value.

8. The data queuing apparatus according to claim 7, wherein
   said counter is provided for each bit of said data shift means.

9. The data queuing apparatus according to claim 1, further comprising
   priority storing means for storing priority, wherein
   said searching means includes means for searching in accordance with an AND output of the priority stored in said priority storing means and said destination indicating bit.

10. The data queuing apparatus according to claim 9, further comprising
    a counter provided corresponding to each stage of the data queuing portions, incremented every time a priority data is input to the corresponding data queuing portion and decremented every time priority data is output from the corresponding data queuing portion; wherein
    said searching means searches when count value of said counter reaches a prescribed value.

11. The data queuing apparatus according to claim 9, wherein
    said counter includes a plurality of counters provided corresponding to a plurality of different priorities, for each stage of said data queuing portions,
    said apparatus further comprising
    AND means for selecting an output having higher priority from outputs of said respective counters, providing an AND of the selected output and said destination indicating bit and for applying the result to the searching means.

12. The data queuing apparatus according to claim 9, further comprising
    means for clearing said priority storing means at a prescribed ratio for reading data with lower priority at a prescribed ratio.

13. The data queuing apparatus according to claim 1, wherein of said respective data queuing portions, a data queuing portion having valid data detected in a preceding stage and valid data with higher priority detected in the next stage transmits an invalidating signal to the preceding stage, and when priority of the data held by said data queuing portion of the preceding stage is not high, said data queuing portion of the preceding stage stops transmission of a detecting signal.

14. The data queuing apparatus according to claim 13, wherein said data queuing portion of the preceding stage stops transmission of said detecting signal when the priority of the data held therein is lower than the priority according to the invalidating signal applied from the data queuing portion of the succeeding stage.

15. The data queuing apparatus according to claim 1, further comprising a data input portion for inputting data at a head portion of each of said stages of data queuing portions.

16. The data queuing apparatus according to claim 15, further comprising means for activating only that searching means which corresponds to the data queuing portion of a used stage, out of said stages of said data queuing portions.

17. The data queuing apparatus according to claim 1, further comprising gate means provided between each of said stages of data queuing portions for stopping shifting operation of a data queuing portion which is not storing valid data.

18. A data queuing apparatus, comprising:

a plurality of data shift means each for shifting while holding data;

a plurality of destination indicating bit storing means provided corresponding to said respective data shift means; and searching means arranged adjacent to said destination bit indicating means for searching said destination indicating bit and outputting searched data.

19. The data queuing apparatus according to claim 18, wherein said searching means is arranged along a central portion of said plurality of destination indicating bit storing means.

20. The data queuing apparatus according to claim 19, further comprising a bus for performing time division of indicating bits from said plurality of destination indicating bit storing means and for guiding the bits to said searching means.

21. The data queuing apparatus according to claim 20, wherein said searching means searches, in pipelined manner, each said destination indicating bit.

22. The data queuing apparatus according to claim 18, wherein said destination indicating bit storing means includes latch means for latching said destination indicating bit, and control means for letting, when said latch means does not hold any destination indicating bit, said latch means hold a destination indicating bit from a succeeding stage, and when latch means of a preceding stage does not hold any destination indicating bit, letting the destination indicating bit of said latch means be shifted to the preceding stage.

23. A data queuing apparatus including a plurality of data shift means each shifting while holding data, a plurality of destination indicating bit storing means provided corresponding to said respective data shift means for storing destination indicating bits indicative of destinations of respective data, and searching means for searching said destination indicating bits and outputting searched data, wherein said destination indicating bits are divided into a plurality of groups each including a plurality of destination indicating bits as a unit, said data queuing apparatus comprising a preceding stage data queuing circuit provided in a preceding stage for outputting data and destination indicating bits for each of said plurality of groups, and a plurality of succeeding stage data queuing circuits provided for each of said plurality of groups and receiving the data and the destination indicating bits output from said preceding stage data queuing circuit.

24. The data queuing apparatus according to claim 23, wherein said destination indicating bits divided into a plurality of groups include a destination indicating bit and a bit for identifying a group to which the destination indicating bit belongs, data shift means of said preceding stage data queuing circuit and plurality of data queuing circuits of the succeeding stage each include an area for holding said data and said destination indicating bit, said destination indicating bit storing means includes control means responsive to said identifying bit for letting said data shift means hold said data and said destination indicating bit, data output from the data shift means of the preceding stage is applied to the data shift means of each of said data queuing circuits of the succeeding stage, and input to the area of said destination indicating bit being grounded, and control means of said succeeding stage includes means responsive to the destination indicating bit applied from the data shift means of the preceding stage for letting the data shift means of said succeeding stage hold the data from the preceding stage.

25. The data queuing apparatus according to claim 23, wherein said destination indicating bits divided into a plurality of groups include a destination indicating bit and a bit for identifying a group to which destination indicating bit belongs, said data shift means and said destination indicating bit storing means are provided corresponding to each of said plurality of groups, said apparatus further comprising address filter means for applying destination indicating bit corresponding to each said group and said data to the corresponding data shift means and the destination indicating bit storing means.

* * * * *